(12) United States Patent
Yamada et al.

(10) Patent No.: US 8,289,617 B2
(45) Date of Patent: Oct. 16, 2012

(54) OPTICAL LOW-PASS FILTER AND IMAGING APPARATUS HAVING SAME

(75) Inventors: Kazuhiro Yamada, Saitama (JP); Hidenori Takushima, Saitama (JP); Ken Hirunuma, Tokyo (JP); Takanobu Shiokawa, Kanagawa (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 649 days.

(21) Appl. No.: 12/167,461

(22) Filed: Jul. 3, 2008

(65) Prior Publication Data
US 2009/0009857 A1    Jan. 8, 2009

(30) Foreign Application Priority Data
Jul. 5, 2007  (JP) ................. 2007-177665

(51) Int. Cl.
*F21V 9/04* (2006.01)
(52) U.S. Cl. ....................... 359/359
(58) Field of Classification Search ............ None
See application file for complete search history.

(56) References Cited

U.S. PATENT DOCUMENTS

| | | |
|---|---|---|
| 7,006,138 B2 | 2/2006 | Kawai |
| 2001/0007475 A1* | 7/2001 | Mogamiya ............ 348/374 |
| 2001/0010594 A1 | 8/2001 | Oono |
| 2003/0202114 A1 | 10/2003 | Takizawa et al. |
| 2004/0012714 A1* | 1/2004 | Kawai ............ 348/374 |
| 2004/0028914 A1 | 2/2004 | Yanome |
| 2004/0080826 A1 | 4/2004 | Noguchi |
| 2004/0104387 A1 | 6/2004 | Mogamiya et al. |
| 2004/0184149 A1 | 9/2004 | Noguchi |
| 2006/0032739 A1 | 2/2006 | Ikeda et al. |
| 2006/0193069 A1* | 8/2006 | Miyazaki et al. ............ 359/883 |
| 2007/0296819 A1 | 12/2007 | Takizawa et al. |

FOREIGN PATENT DOCUMENTS

| | | |
|---|---|---|
| JP | 7-198921 | 8/1995 |
| JP | 9-202649 | 8/1997 |
| JP | 9-202651 | 8/1997 |
| JP | 2001-257945 | 9/2001 |
| JP | 2001-298640 | 10/2001 |
| JP | 2002-146271 | 5/2002 |
| JP | 2002-204379 | 7/2002 |
| JP | 2003-319222 | 11/2003 |
| JP | 2004-253601 | 9/2004 |
| JP | 2004-309827 | 11/2004 |
| JP | 2005-126813 | 5/2005 |
| JP | 3688042 | 6/2005 |

(Continued)

OTHER PUBLICATIONS

English language Abstract of JP 7-198921, Aug. 1, 1995.

(Continued)

*Primary Examiner* — Derek S Chapel
(74) *Attorney, Agent, or Firm* — Greenblum & Bernstein, P.L.C.

(57) ABSTRACT

An optical low-pass filter is disposed on a light-receiving surface of an imaging device. The filter has a light-transmitting substrate including at least one birefringent plate and an infrared-cut plate, a dust-proofing layer provided on a light-input surface of the light-transmitting substrate, and an infrared-cut coat layer provided between the dust-proofing layer and the light-transmitting substrate or on a light-output surface of the light-transmitting substrate. A surface of the dust-proofing layer contains fine roughness.

19 Claims, 17 Drawing Sheets

FOREIGN PATENT DOCUMENTS

| | | |
|---|---|---|
| JP | 2005-234447 | 9/2005 |
| JP | 2006-71851 | 3/2006 |
| JP | 2006-163275 | 6/2006 |
| JP | 2006-221142 | 8/2006 |
| JP | 2007-017917 | 1/2007 |
| JP | 2007-101729 | 4/2007 |
| JP | 2007-135198 | 5/2007 |

OTHER PUBLICATIONS

English language Abstract of JP 9-202649, Aug. 5, 1997.
English language Abstract of JP 9-202651, Aug. 5, 1997.
English language Abstract of JP 2001-298640, Oct. 26, 2001.
English language Abstract of JP 2004-253601, Sep. 9, 2004.
English language Abstract of JP 2006-71851, Mar. 16, 2006.
English language Abstract of JP 2006-163275, Jun. 22, 2006.
English language Abstract of JP 2007-101729, Apr. 19, 2007.
Japanese Office Action mailed Sep. 7, 2011, for corresponding Japanese Patent Application No. 2007-177665 (with English language translation).

* cited by examiner

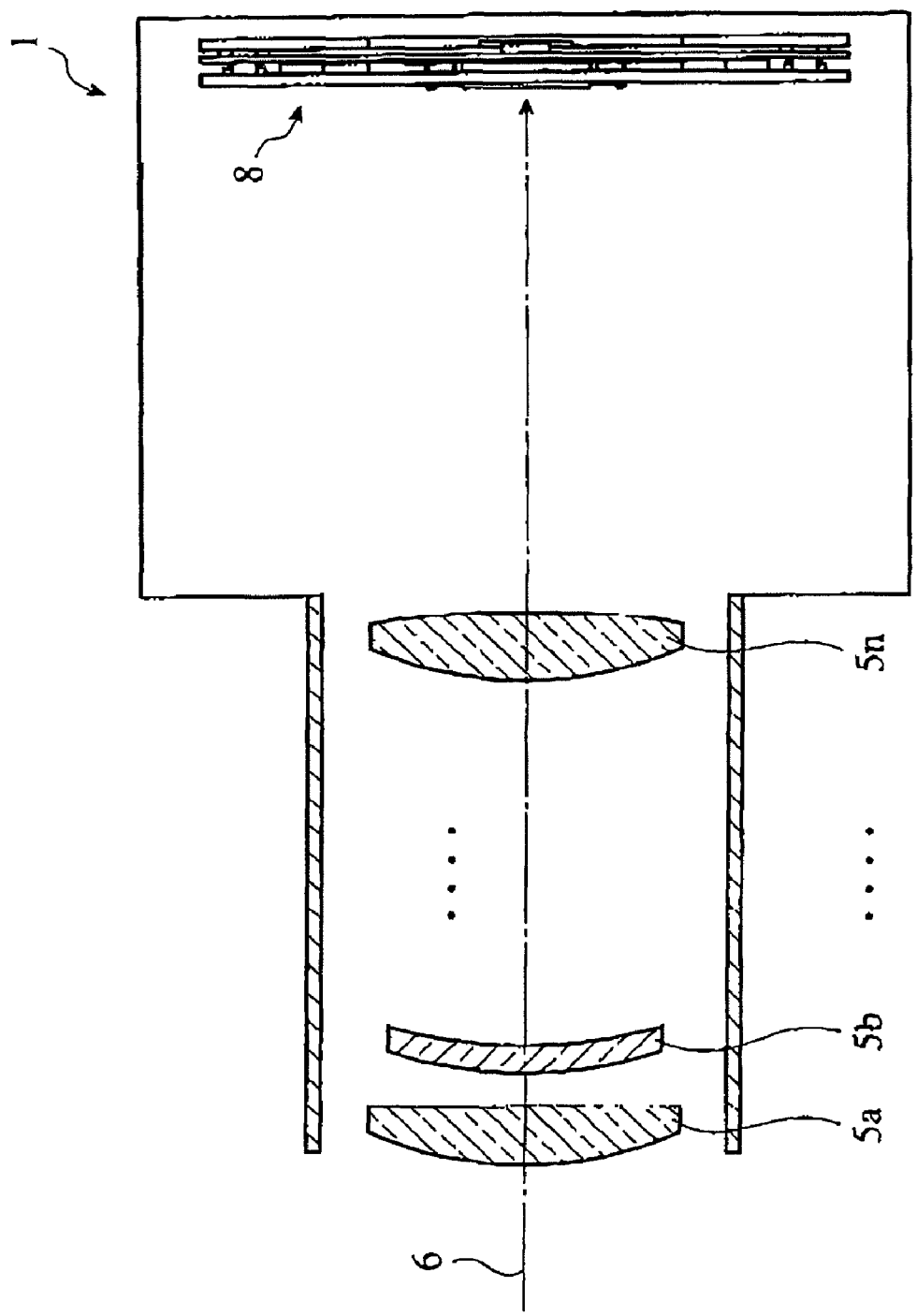

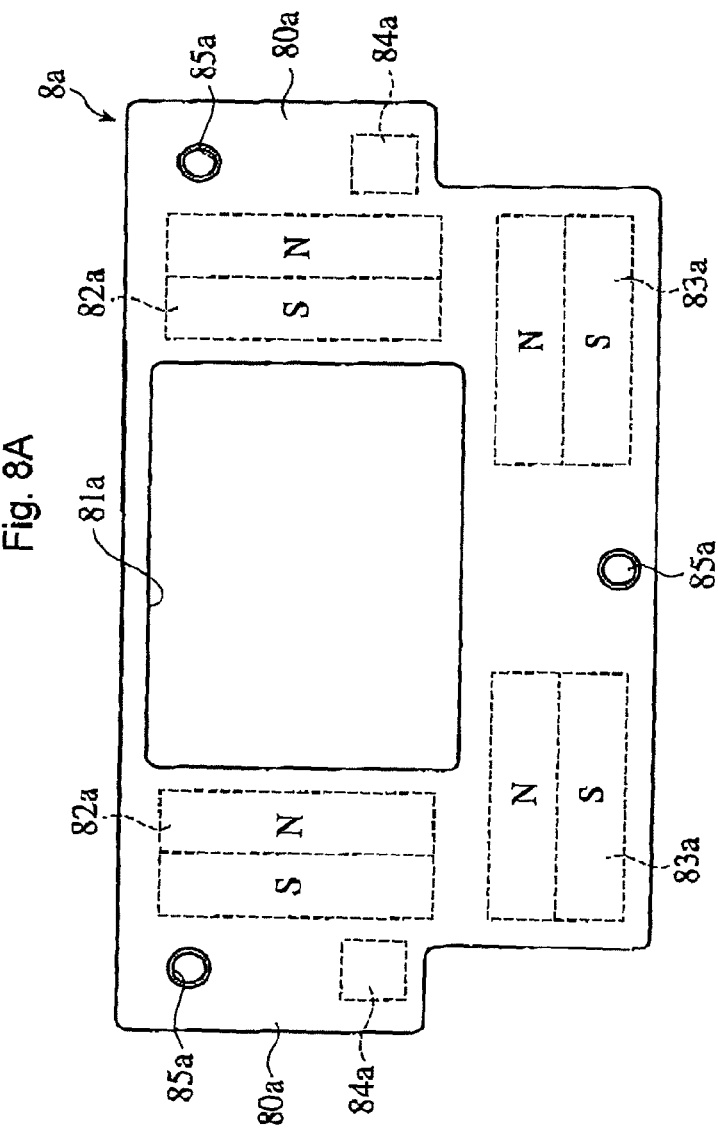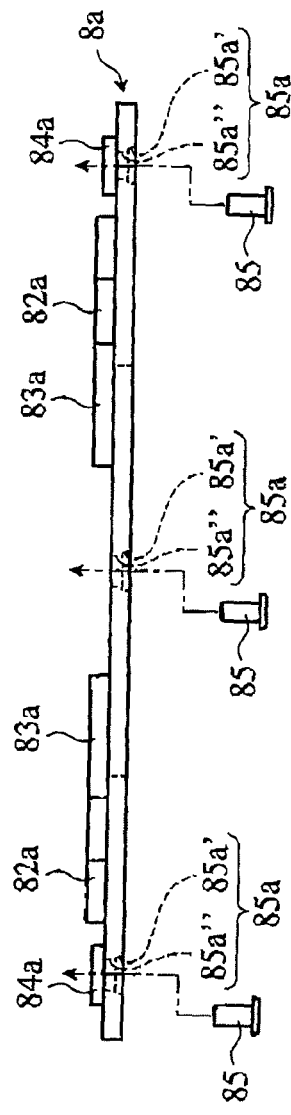

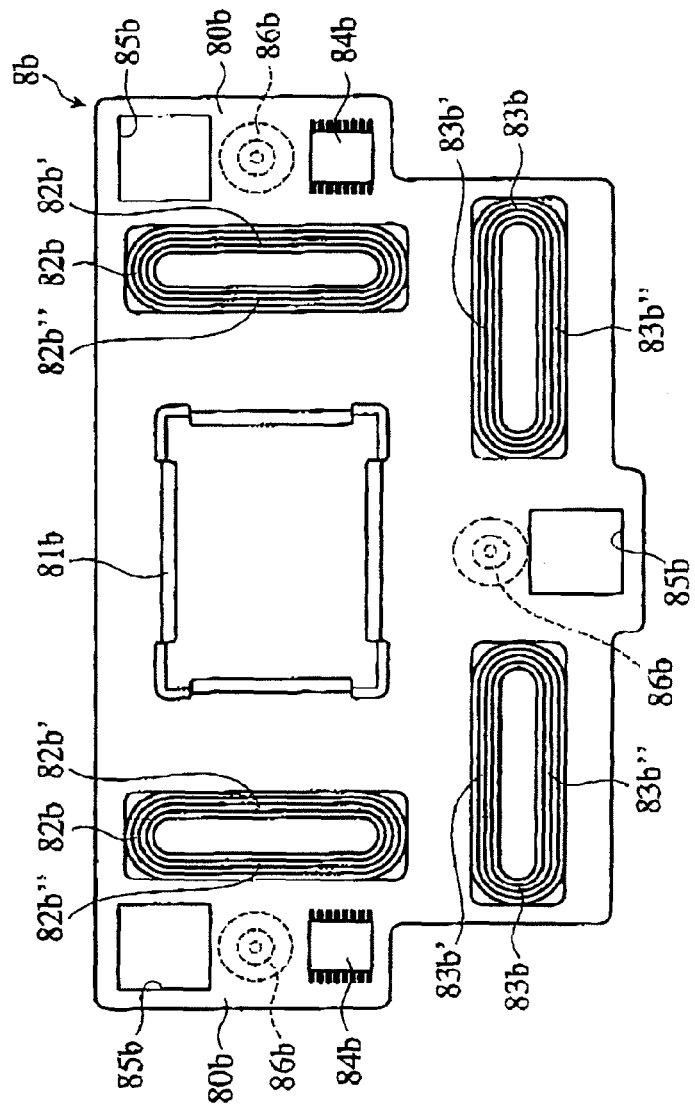
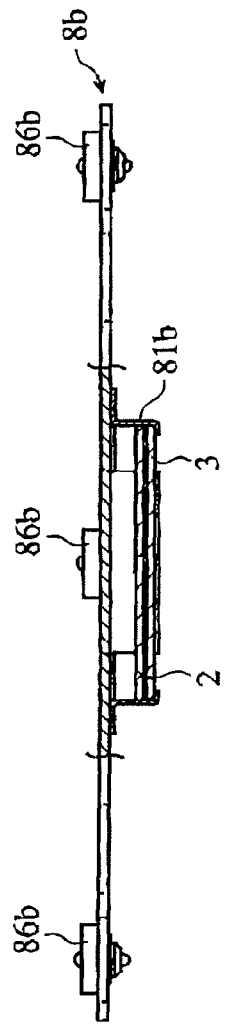

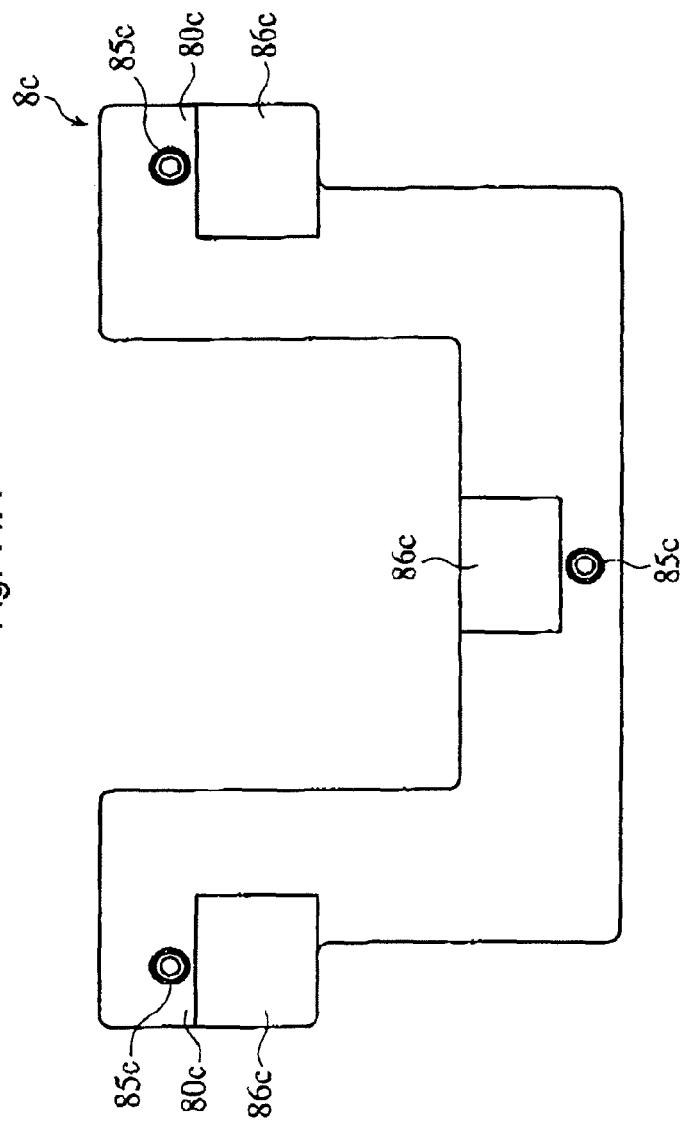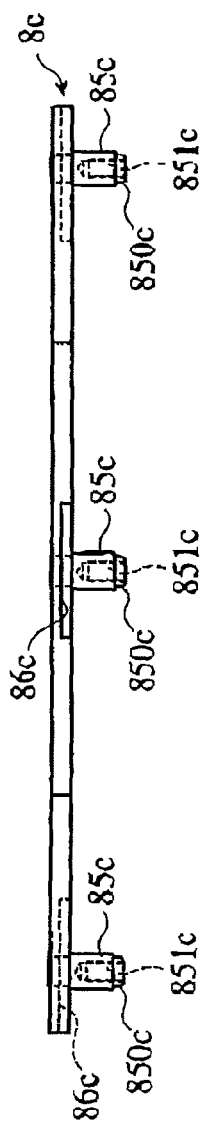

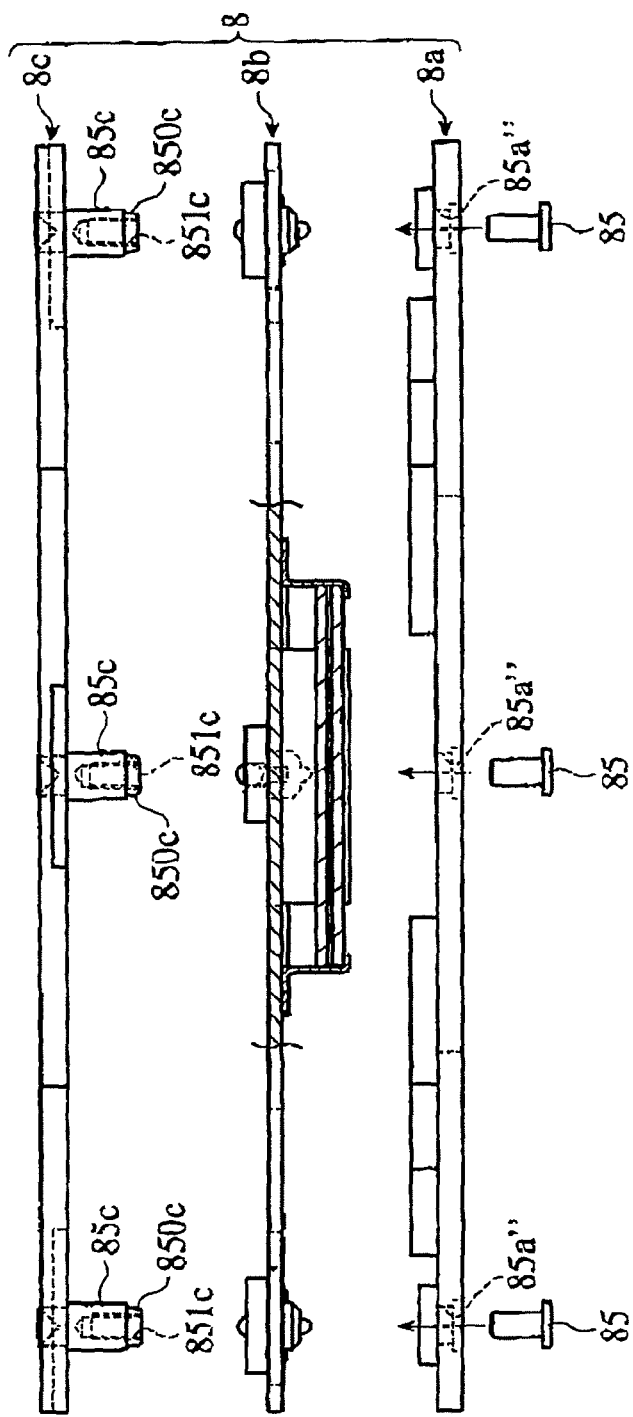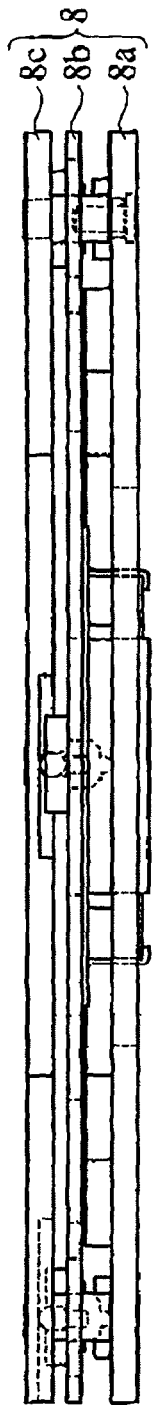

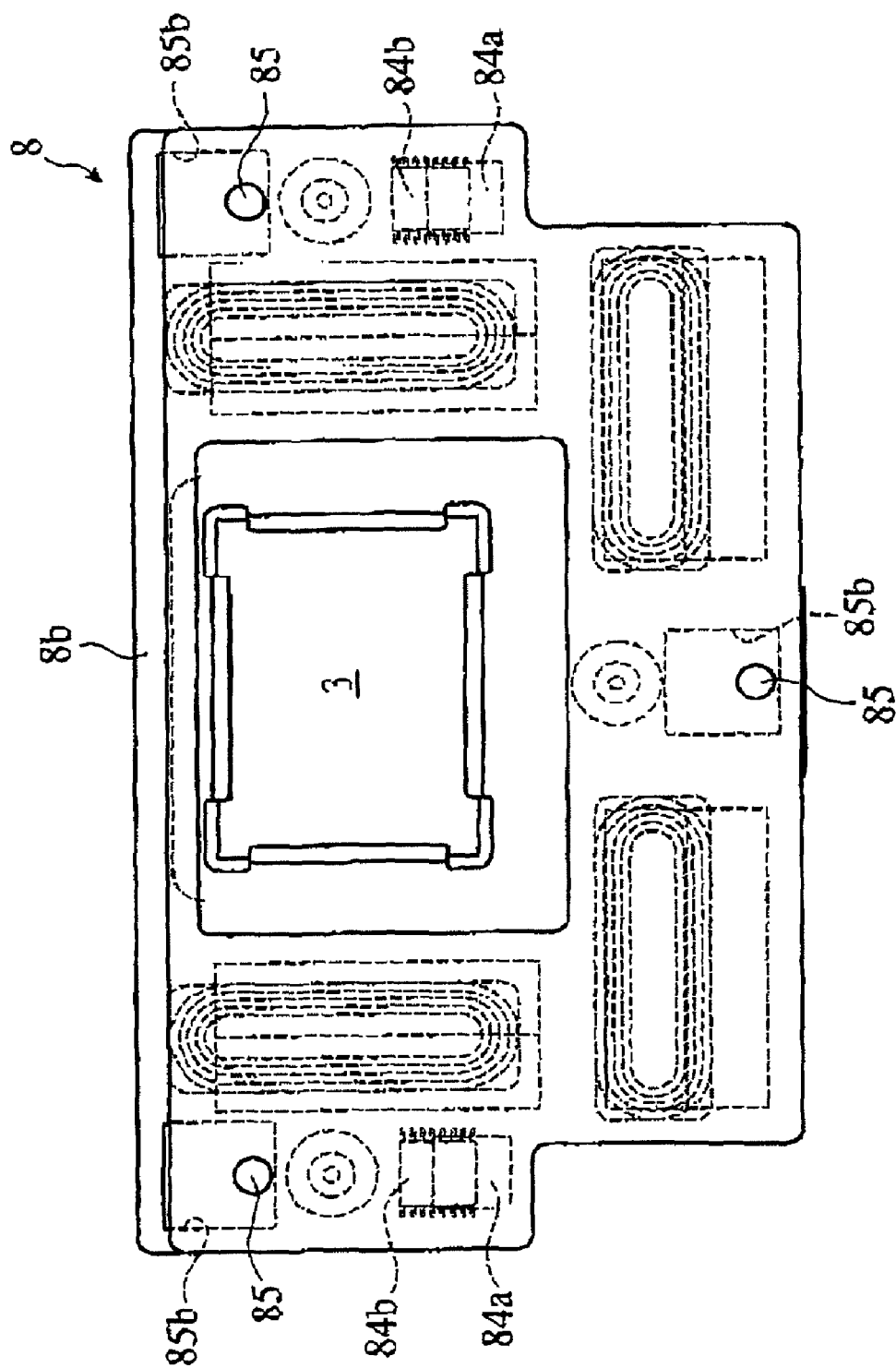

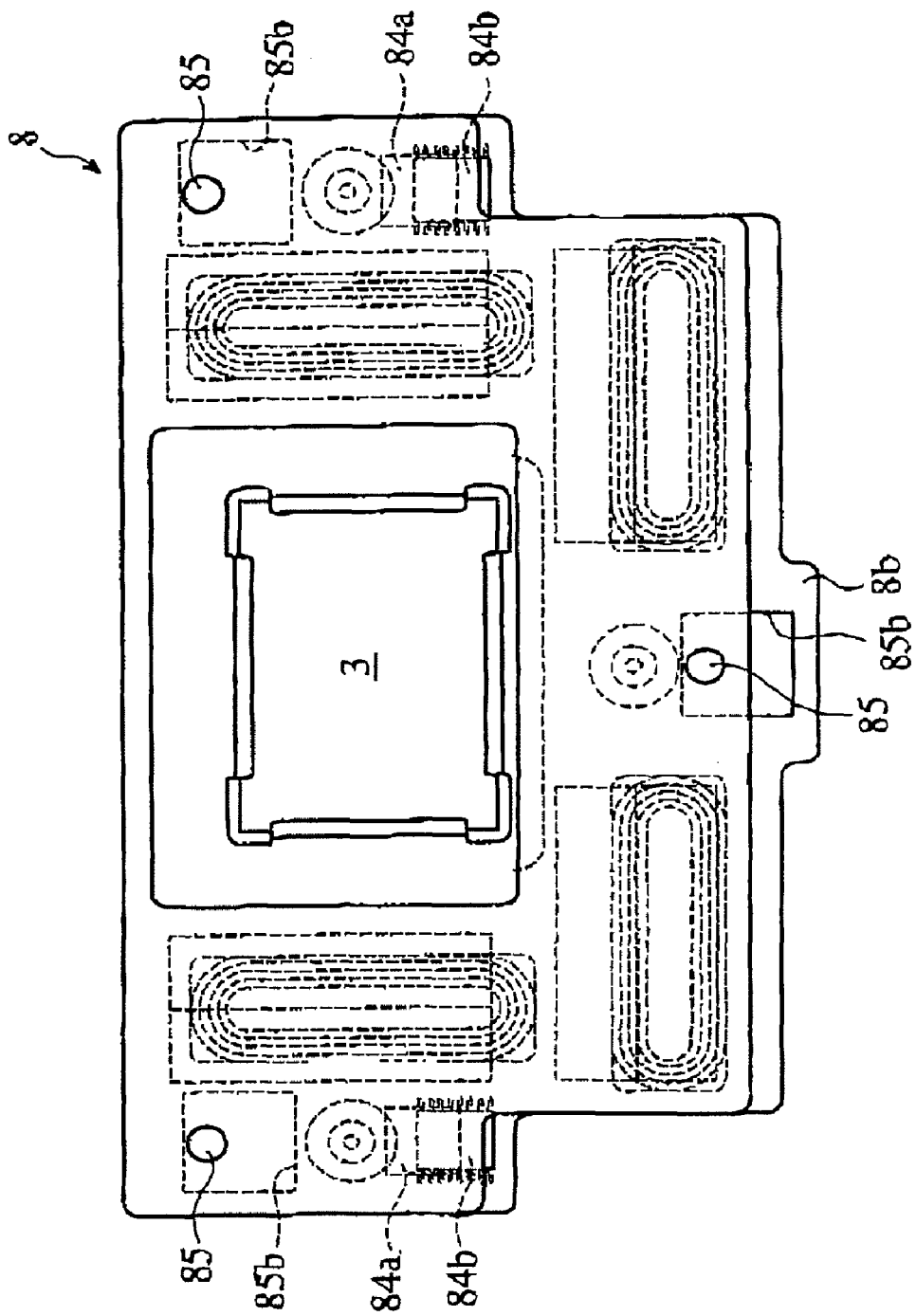

OPTICAL LOW-PASS FILTER AND IMAGING APPARATUS HAVING SAME

BACKGROUND OF THE INVENTION

1. Field of the Invention

The present invention is related to an optical low-pass filter having high dust-proofing and infrared-cut properties and an imaging apparatus having the filter.

2. Description of the Related Art

Nowadays, electronic imaging apparatuses which convert an optical image into an electric signal, such as digital still cameras, facsimile machines, scanners, and so on, are widely used. If dust exists in the optical path of a light-receiving surface of an imaging device such as a CCD in an electronic imaging apparatus, the dust will appear in the whole captured image.

For example, as for a digital still single-lens reflex camera with an interchangeable photographing lens, when the photographing lens is removed from the camera body, dust may easily come into the mirror box. In another situation, dust may be generated in the mirror box by the mechanism for controlling the mirror or a diaphragm of a photographing lens. For example, in the case of a facsimile machine or scanner, when a document is sent to a document image reader or the document image reader moves, dust may also be generated. The generated dust may adhere to a light-receiving surface of the CCD or the platen glass. Even when such dust is blown off by a blower, the blown dust remains in the mechanism.

In particular, an optical filter for controlling spatial frequency is located near the imaging device in a digital still camera. A quartz birefringent plate is generally used as the optical filter. Quartz easily collects an electrical charge from vibration and the electrical charge is not easily released because quartz has a piezoelectric effect. Accordingly, dust floating in a camera due to air flow or vibration caused by some operation in the camera may adhere to an optical filter carrying an electrical charge. Accordingly, in order to take a clear photograph, frequent cleaning by an air blower is necessary.

To address this problem, Japanese Unexamined Patent Publication (KOKAI) No. 2001-298640 discloses a digital still camera having a wiper which wipes an outside face of a dust-proofing mechanism. In addition, Japanese Unexamined Patent Publication No. 2002-204379 (U.S. Pub. No. 2004-012714) and Japanese Unexamined Patent Publication No. 2003-319222 (U.S. Pub. Nos. 2003-202114 and 2007-296819) disclose a camera having a holder and a vibrator. The holder has an aperture. A CCD and an optical low-pass filter are mounted in the holder. The aperture is covered and sealed with a dust-proofing member. Dust does not adhere to the CCD and the optical low-pass filter in the holder. In addition, dust adhering to the dust-proofing member is removed by vibration produced by the vibrator. However, the mechanical removal of dust, as disclosed in the above publications has many problems, such as an increase of manufacturing cost, an increase of apparatus weight, an increase of power consumption, and so on.

Furthermore, Japanese Unexamined Patent Publication No. 2006-71851 discloses an optical low-pass filter which is composed of a birefringent and piezoelectric crystal plate. This low-pass filter has a transparent electrically-conductive layer and an anti-reflective layer which are provided on one surface of the filter and an infrared-cut coat or an infrared-and ultraviolet-cut coat which is provided on the other surface. This low-pass filter can prevent dust adherence because static charge is reduced by the transparent electrically-conductive layer.

Furthermore, Japanese Unexamined Patent Publication No. 2006-163275 discloses an optical article having: (1) a substrate which is composed of an optical low-pass filter and an infrared-cut plate, (2) an uncontaminated layer which consists of a material including fluorine and provided on a light-input surface of the substrate, (3) an infrared-cut coat which is provided between the substrate and the uncontaminated layer, and (4) an anti-reflective layer which is provided on a light-output surface of the substrate.

The low-pass filter disclosed in No. 2006-71851 and the optical article in No. 2006-163275 have high infrared property, and can prevent dust adherence, but the dust-proof property is inadequate.

SUMMARY OP THE INVENTION

Therefore, an object of the present invention is to provide an optical low-pass filter which has high dust-proof and infrared-cut properties, and an imaging apparatus having this filter.

In accordance with an aspect of the present invention, there is provided an optical low-pass filter which is disposed over a light-receiving surface of an imaging device. The filter has a light-transmitting substrate, a dust-proofing layer, and an infrared-cut coat layer. The substrate has at least one birefringent plate and an infrared-cut plate. The dust-proofing layer is provided on a light-input surface of the light-transmitting substrate, and fine roughness is provided at the surface of the dust-proofing layer. The infrared-cut coat layer is provided between the dust-proofing layer and the light-transmitting substrate or on the light-output surface of the light-transmitting substrate.

In accordance with another aspect of the present invention, an optical low-pass filter is disposed on the light-receiving surface of an imaging device. The filter has a birefringent plate, an infrared-cut plate, a dust-proofing layer, and an infrared-cut coat layer. The birefringent plate and the infrared-cut plate are disposed parallel to each other in that order from the light-input side. The dust-proofing layer is provided on the light-input surface of the birefringent plate, and fine roughness is provided at the surface of the dust-proofing layer. The infrared-cut coat layer is provided between the dust-proofing layer and the birefringent plate or on a light-output surface of the infrared-cut plate.

Furthermore, the present invention is directed to an imaging apparatus having the above-mentioned optical low-pass filter.

BRIEF DESCRIPTION OF THE DRAWINGS

The objects and advantages of the present invention will be better understood from the following description, with reference to the accompanying drawings in which:

FIG. 7A is a partial cross-sectional view of one embodiment of a digital still camera having an optical low-pass filter which is mounted on a stage apparatus;

FIG. 8A is a front view of a first holding plate in the stage apparatus of FIG. 7A;

FIG. 8B is a plan view of the first holding plate in the stage apparatus of FIG. 7A;

FIG. 9A is a front view of a stage plate in the stage apparatus of FIG. 7A;

FIG. 9B is a plan view of the stage plate in the stage apparatus of FIG. 7A;

FIG. 11A is a front view of a second holding plate in the stage apparatus of FIG. 7A;

FIG. 11B is a plan view of the second holding plate in the stage apparatus of FIG. 7A;

FIG. 12A is an exploded plan view of the stage apparatus of FIG. 7A;

FIG. 12B is a plan view of the stage apparatus of FIG. 7A;

FIG. 15 is a front view of the stage apparatus of FIG. 7A in which the stage plate moves upward from the initial position; and FIG. 16 is front view of the stage apparatus of FIG. 7A in which the stage plate moves downward from the initial position.

DESCRIPTION OF THE PREFERRED EMBODIMENTS

Figure 1A:
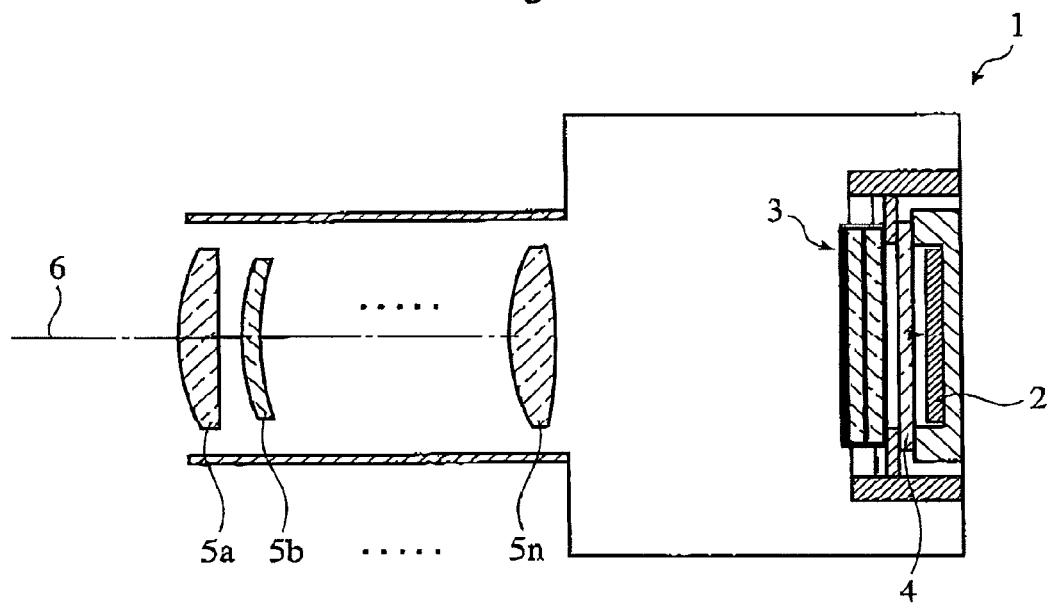
FIG. 1A is a partial cross section view of one embodiment of a digital still camera having an optical low-pass filter.

The present invention will be described below with reference to the embodiments shown in the drawings.

[1] The First Optical Low-Pass Filter

The first optical low-pass filter comprises: at least (1) a light-transmitting substrate which is composed of a stack of at least one birefringent plate and an infrared-cut plate, (2) a dust-proofing layer which is provided on a light-input surface of the light-transmitting substrate, with fine roughness formed at a surface of the dust-proofing layer, and (3) an infrared-cut coat layer which is provided between the dust-proofing layer and the light-transmitting substrate or on a light-output surface of the light-transmitting substrate.

Preferably, the first optical low-pass filter has a water-repellent or water-and oil-repellent layer (hereinafter, called a "water-oil repellent layer") on its outermost surface. The first optical low-pass filter may have an anti-static layer between the water-oil repellent layer and the dust-proofing layer or between the dust-proofing layer and the light-transmitting substrate. The first optical low-pass filter may have an anti-reflective layer which is provided on a light-output surface of the light-transmitting substrate. The first optical low-pass filter may have a silica layer as an undercoat layer of the water-oil repellent layer.

(1) Light-Transmitting Substrate (a) Birefringent Plate

The birefringent plate is exemplified by a plate comprising birefringent material and a light-transmission plate having a birefringent diffraction grating. The birefringent material plate, may be a plate comprising a known birefringent inorganic material such as crystal, lithium niobate, lithium tetraborate, etc., or a plate of a stretched high-molecular film (e.g., phase difference film). The plate disclosed in Japanese Unexamined Patent Publication No. 7-198921 may be utilized as the light-transmission plate with the birefringent diffraction grating.

The light-transmitting substrate may have two or more birefringent plates. In this case, the same or a different type of birefringent plate may be utilized in the same substrate. For example, a crystal plate and a lithium niobate plate can be combined and compose the same substrate. The two or more birefringent plates are preferably disposed so that the light-split directions of the birefringent plates differ. For example, two birefringent plates are plied so that the directions in one plate are perpendicular to those in other plate.

(b) Infrared-Cut Plate

The infrared-cut plate may comprise a known infrared absorbing glass, or a known infrared absorbing resin etc., but preferably comprises an infrared absorbing glass. An example of the infrared absorbing glass is a blue glass in which color materials such as copper ions are dispersed. The infrared absorbing glass is not limited to a glass component consisting of component having the infrared absorbing property, but may be a mixture of the glass component having the infrared absorbing property and another glass component. One infrared-cut plate can be utilized in the first optical low-pass filter.

(c) Stack Structure

The structure of the stack of the birefringent plate and the infrared-cut plate are not limited to the specific structure. An example of the structure is a stack of one to four birefringent plates, and infrared-cut plate; a stack of infrared-cut plate, and one to four birefringent plates; or a stack of one to four birefringent plates, infrared-cut plate, and one to four birefringent plates; which are stacked in that order from the light-input surface in each structure.

(d) Method of Producing Light-Transmitting Substrate

The light-transmitting substrate is produced by bonding the birefringent plate(s) and the infrared-cut plate so that the desired stack structure is obtained. The adhesive for bonding these is not limited so long as the effect of the invention is preserved.

(2) Dust-Proofing Layer

The dust-proofing layer is disposed on the light-input surface of the light-transmitting substrate. Fine roughness is formed at the surface of the dust-proofing layer. Generally, the intermolecular force of a dust particle adhering to the dust-proofing layer diminishes as the three-dimensional average surface roughness of the dust-proofing layer increases. Furthermore, the three-dimensional average surface roughness is an index of the surface density of the fine roughness, and is hereinafter referred to as SRa. In addition, the contact-charging adhesion force (hereinafter referred to as $F_1$) between a spherical dust particle which is uniformly electrically charged and the optical low-pass filter is represented by the following formula, and generated by the difference in the chemical potentials.

$$F_1 = -\frac{\pi \varepsilon_0 V_C^2 A^2 k^2 D^2}{457(z_0 + b)^6} \quad (1)$$

In the above formula, the $\varepsilon_0$ is the permittivity of free space, equal to $8.85 \times 10^{-12}$ (F/m); $V_c$ is the contact potential difference between the dust-proofing layer of the optical low-pass filter and a dust particle; A is the Hamaker constant equivalent to the van der Waals interaction; k is a coefficient equal to the sum of k1 ($=(1-v_1^2)/E_1$) and k2 ($=(1-v_2^2)/E_2$); $v_1$ and $v_2$ are Poisson ratios of the dust-proofing layer and dust particle, respectively; $E_1$ and $E_2$ are Young's moduli of the dust-proofing layer and dust particle, respectively; D is the dust particle diameter; $Z_0$ is the distance between the dust-proofing layer and the dust particle; and b is the SRa of the dust-proofing layer. It is clear from Formula 4 that $F_1$ diminishes as the SRa of the dust-proofing layer becomes larger.

Concretely, when the dust-proofing layer is made so that the SRa of the dust-proofing layer is greater than or equal to 1 nm, the intermolecular force of the dust particles which adheres to the dust-proofing layer, and $F_1$ are sufficiently low. However, if the SRa of the dust-proofing layer is more than 100 nm, incident light disperses on the dust-proofing layer. Light dispersion is unsuitable for an imaging apparatus. Consequently, it is preferable that the SRa of the dust-proofing layer be from 1 to 100 nm. More preferably, the SRa is from 8 to 80 nm. Most preferably, the SRa is from 10 to 50 nm. The SRa is an index calculated by taking the center-line average roughness which is defined by JIS B0601 using an atomic force microscope, in three dimensions. The SRa is represented by the following formula.

$$SRa = \frac{1}{S_0} \int_{Y_B}^{Y_T} \int_{X_L}^{X_R} |F(X,Y) - Z_0| dX dY \quad (2)$$

In Formula 2, X and Y represent X and Y dimensions; $X_L$ and $X_R$ are both ends of a surface to be measured in the X dimension; $Y_B$ and $Y_T$ are both ends of the surface to be measured in the Y dimension; $S_0$ is the area of the surface to be measured assuming it were flat, calculated as $|X_R-X_L| \times |Y_T-Y_B|$; F(X,Y) is the height at each measured point (X,Y); and $Z_0$ is the average height of the surface to be measured.

The Hamaker constant A in Formula 1 is approximated by a function of a refractive index, and the constant A gets smaller as the refractive index becomes smaller. Specifically, if the dust-proofing layer is the outermost layer, or if the water-oil repellent layer as described below is formed on the surface of the dust-proofing layer, it is preferable that the refractive index of the dust-proofing layer be less than or equal to 1.50, and it is more preferable that the refractive index be less than or equal to 1.45. The maximum peak-to-valley value (hereinafter-referred to as P-V) in the fine roughness of the dust-proofing layer is not limited but is preferably 5 to 1,000 nm. Furthermore, the maximum peak-to-valley value means the height difference between the highest peak and the lowest valley. More preferably, the P-V is 50 to 500 nm, and most preferably it is 100 to 300 nm. When the P-V is 5 to 1,000 nm, the dust-proofing layer possesses an especially high anti-glare property. In addition, when the P-V is 50 to 500 nm, the dust-proofing layer will also have high transmissibility. P-V can be measured with an atomic force microscope.

The specific surface area of the dust-proofing layer is not limited, but it is preferable that the specific surface area (hereinafter, referred to as $S_R$) of the dust-proofing layer, be greater than or equal to 1.05. It is more preferable that the $S_R$ of the dust-proofing layer be greater than or equal to 1.15. However, it is preferable that the $S_R$ of the dust-proofing layer not be so large that light can not be dispersed on the surface. The $S_R$ is calculated by the formula $$S_R = S/S_0 \quad (3)$$

In Formula 3, the $S_0$ is the area of the surface to be measured assuming that the surface to be flat, and S is calculated by the following method. The surface to be measured is divided into a multiple fine triangles having three vertices. Vector product $|a \times b|$, a being the vector from a first vertex to a second vertex and the h being a vector from a first vertex to a third vertex, is calculated as the area of each fine triangle. The S is calculated by summing the areas of all the fine triangles.

The dust-proofing layer may be formed by treating a gel layer including alumina or a deposited layer comprising aluminum, alumina or a mixture of these, with hot water; or it may be formed by treating a gel layer including zinc compound with water having a temperature greater than or equal to 20 degrees Celsius, for example.

The former comprises a roughness which is composed of irregularly distributing a plurality of convexities, each having an irregular fine shape, and a plurality of groove-shaped concavities between them. The convexities are produced when the hot water acts on the superficial layer of the gel or deposited layer. This layer is called a "finely rough alumina layer" unless otherwise noted.

The latter comprises a roughness which is composed of irregularly distributing a plurality of convexities and a plurality of concavities between them. The convexity is formed of a precipitate which is produced when water at a temperature greater than or equal to 20 degrees Celsius acts on the superficial layer of the gel layer including the zinc compound. The shape of the convexity varies according to the kind of the zinc compound, but is quite fine. This layer is called the "finely rough zinc compound layer" unless otherwise noted.

The main component of the finely rough alumina layer is preferably alumina, aluminum hydroxide, or a mixture of these. It is more preferable that the finely rough alumina layer consist of alumina, but it may include at least one optional component which is selected from the group consisting of zirconia, silica, titania, zinc oxide, and zinc hydroxide, if desired. The quantity of the optional component(s) is not limited so long as the fine roughness can be produced by treating the gel layer or the deposited layer with hot water and the transparency of the dust-proofing layer is not lost. However, this quantity preferably ranges from 0.01 to 50 mass percents, and more preferably, 0.05 to 30 mass percents with respect to 100 mass percents for the whole dust-proof layer.

The main component of the finely rough zinc compound layer is preferably zinc oxide, and/or zinc hydroxide. It is more preferable that the finely rough zinc compound layer consist of the one described above, but it may include at least one optional component which is selected from the group consisting of alumina, zirconia, silica, and, titania, if desired. The quantity of the optional component(s) is not so long as the fine roughness can be produced by treating the gel layer including the zinc compound with water having a temperature greater than or equal to 20 degrees Celsius and the transparency of the dust-proofing layer is not lost. However, preferably it ranges from 0.01 to 50 mass percents, and more preferably 0.05 to 30 mass percents with respect to 100 mass percents for the whole dust-proofing layer.

The dust-proofing layer may be formed by patterning a layer comprising metal oxide such as alumina, zinc oxide, zirconia, silica, titania, etc. by a photolithographic method.

The roughness of the dust-proofing layer can be detected by observing the superficial layer or the cross-section using a scanning electron microscope, or by observing the superficial layer using an atomic force microscope (especially, by observing the superficial layer obliquely). The thickness of the dust-proofing layer is not limited, and may be determined according to the application, but is preferably 0.05 nm to 3 μm. The thickness includes the fine roughness of the surface.

(3) Infrared-Cut Coat Layer

The infrared-cut coat layer is disposed between the dust-proofing layer and the light-transmitting substrate or on the light-output surface of the light-transmitting substrate. The infrared-cut coat layer may be capable of cutting ultraviolet light as well as infrared light.

A dielectric multilayer can be utilized as the infrared-cut coat layer or the ultraviolet and infrared-cut coat layer. The dielectric multilayer comprises a material having a relatively high refractive index, such as $TiO_2$, $ZrO_2$, $Ta_2O_5$, $Nb_2O_5$, (ZnO+Ga), etc. and a material having a relatively low refractive index, such as $SiO_2$, $MgF_2$, etc., which are alternately plied. Furthermore, the layer disclosed in Japanese Unexamined Patent Publication NO. 2007-101729 can be utilized as the infrared-cut coat layer. In addition, the layer disclosed in Japanese Unexamined Patent Publication NO. 2005-126813 (U.S. Pub. No. 2006-032739A) can be utilized as the ultraviolet and infrared-cut coat layer.

(4) Water-Oil Repellent Layer

The optical low-pass filter (first optical low-pass filter) has a water-oil repellent layer on its outermost surface.

A liquid bridge force, hereinafter referred to as $F_2$, between a spherical dust particle and the optical low-pass filter is represented by the following formula, and is the force of a liquid bridge generated by condensing the liquid at a contact point between the optical low-pass filter and the dust particle.

$$F_2 = -2\pi\gamma D \tag{4}$$

In Formula 4, γ is the surface tension of the liquid, and D is a dust particle diameter. Consequently, the amount of water or oil adhering to the low-pass filter is decreased by the water-oil repellent layer, which can reduce the adhesion of the dust particle to the dust-proofing layer caused by $F_2$.

Generally, the relationship between contact angle of water at a rough surface and that at a flat surface is approximated by the following formula.

$$\cos\theta_\gamma = \gamma \cos\theta \tag{5}$$

In Formula 5, $\theta_\gamma$ is the contact angle at a rough surface, γ is the surface area multiplication factor, and θ is the contact angle at a flat surface. The surface area multiplication factor is generally greater than one. Consequently, if θ is less than 90 degrees, $\theta_\gamma$ is less than the θ. On the other hand, if the θ is more than 90 degree, $\theta_\gamma$ is more than the θ.

The hydrophilicity of a hydrophilic surface increases when the area of the hydrophilic surface is increased by making the surface rough. Conversely, the water-repellency of a water-repellent surface increases when the area of the water-repellent surface is increased by making the surface rough.

Accordingly, high water-repellency is obtained by forming a water-repellent layer on a dust-proofing layer having a fine roughness so that the roughness is maintained. Even if the water-oil repellent layer is formed on the outermost surface of the filter, the SRa, the P-V, and the $S_R$ of the outermost surface of the filter are preferably in the ranges described above.

The material of the water-oil repellent layer is not limited to a specified material, and any colorless and highly transparent material can be utilised. An inorganic compound including fluorine, an organic compound including fluorine, an organic and inorganic hybrid polymer including fluorine, a fluorinated pitch such as $CF_n$, (n being 1.1 to 1.6), graphite fluoride, etc., are examples of such material.

At least one compound which is selected from the group consisting of LiF, $MgF_2$, $CaF_2$, $AlF_3$, $BaF_2$, $YF_3$, $LaF_2$, and $CaF_3$ may be used as the inorganic compound including fluorine. These compounds are available from Canon Optron Inc, for example.

A copolymer of an unsaturated ester monomer including fluoroaliphatic group and an unsaturated silane monomer, and an organic silicone polymer including fluorocarbon group may be used as the organic and inorganic hybrid polymer including fluorine.

As the copolymer of an unsaturated ester monomer including a fluoroaliphatic group and an unsaturated silane monomer, the copolymer of an unsaturated ester monomer including fluoroaliphatic group represented by the following chemical formula 6 disclosed in Japanese Unexamined Patent Publication No. 2002-146271 (U.S. Pub. No. 2004-0028914) and an unsaturated silane monomer represented by the following chemical formula 7 is preferably utilized.

(6)

In the chemical Formula 6, $R^{f1}$ is an aliphatic group which is at least partially fluorinated, $R^1$ is an alkylene group which may have another atomic group, and $R^2$ is hydrogen or a low alkyl group.

(7)

In chemical Formula 7, $R^3$ and $R^4$ are independently hydrogen or a low alkyl group, $X^1$ is an alkoxy group, a halogen group, or a —OC(=O)$R^5$ group, $R^5$ being hydrogen or a low alkyl group, $Y^1$ is a single bond or —$CH_2$— group, and n is an integer ranging from 0 to 2.

A polymer which is obtained by hydrolyzing a silane compound including a fluorocarbon group exemplifies the organic silicone polymer including a fluorocarbon group. The compound represented by the following chemical formula is exemplified as the silane compound including a fluorocarbon group.

$$CF_3(CF_2)_a(CH_2)_sSiR_bX_c \tag{8}$$

In chemical Formula 8, R is an alkyl group, X is an alkoxy group or halogen atom, a is an integer ranging from 0 to 7, b is an integer ranging from 0 to 2, c is an integer ranging from 1 to 3, and (b+c) is equal to 3.

Compounds represented by Formula 8 are $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_2SiCH_3(OCH_3)_2$, $CF_3(CF_2)_7(CH_2)_2SiCH_3Cl_2$, etc. As the organic silicone polymer, the commercially available compound can be utilized, such as XC-98-B2472 manufactured by GE Toshiba Silicone Co., Ltd.

An example of the organic compound including fluorine is fluorocarbon polymer. Examples of the fluorocarbon polymer include a polymer of an olefin compound including fluorine, a copolymer of an olefin compound including fluorine, and a monomer which can be copolymerized therewith. Examples of such polymer and copolymer include polytetrafluoroethylene, tetraethylene-hexafluoropropylene copolymer, ethylene-tetrafluoroethylene copolymer, tetrafluoroethylene-perfluoroalkylvinylether copolymer, ethylene-chlorotrifluoroethylene copolymer, tetrafluoroethylene-hexafluoropropylene-perfluoroalkylvinylether copolymer, polychlorotrifluoroethylene, polyvinilydenefluoride, and polyvinylfluoride.

A compound obtained by polymerizing a commercially available compound including fluorine may be utilized as the fluorocarbon polymer. OPSTAR manufactured by JSR Corporation and CYTOP manufactured by ASAHI GLASS Co., Ltd. are examples of the compound including fluorine.

The thickness of the water-oil repellent layer is preferably 0.4 to 100 nm. The thickness is more preferably 10 to 80 nm. If the thickness is 0.4 to 100 nm, the SRa, the P-V, and the $S_R$ of the outermost surface of the filter can be maintained in the above ranges. If the water-oil repellent layer having thickness of 0.4 to 100 nm is formed at the outermost surface, adhesion of dust decreases further due to the lowering the $F_2$ in addition to the lowering of intermolecular force and the $F_1$ caused by the fine roughness. If the thickness of the water-oil repellent layer is less than 0.4 nm, water and/or oil repellency is insufficient. On the other hand, if the thickness of the water-oil repellent layer is more than 100 nm, adhesion of dust increases because the roughness of the dust-proofing layer is smoothed by the water-oil repellent layer. It is preferable that the refractive index of the water-oil repellent layer be less than or equal to 1.5. It is even more preferable that the index be less than and equal to 1.45.

(5) Anti-Static Layer

The optical low-pass filter may have an anti-static layer between the water-oil repellent layer and the dust-proofing layer or between the dust-proofing layer and the light-transmitting substrate. The anti-static layer lowers the Coulomb's force which causes dust to adhere to the optical low-pass filter. Consequently, the dust-proofing property is improved.

An electrostatic attractive force between a spherical dust particle which is uniformly electrically charged and the optical low pass filter, hereinafter referred to as $F_3$, is represented by the following formula.

$$F_3 = -\frac{1}{4\pi\varepsilon_0} \cdot \frac{q_1 q_2}{r^2} \quad (9)$$

In Formula 9, $q_1$ and $q_2$ are electric charges of the dust-proofing layer and the dust particle, respectively, r is the radius of the dust particle, and $\varepsilon_0$ is the permittivity of free space, equal to $8.85\times10^{-12}$ (F/m). It is obvious from the Formula 9 that $F_3$ can be lowered by decreasing the electrical charges of the dust-proofing layer and the dust particle. Consequently, it is effective to remove the charge using the anti-static layer.

An electric electrostatic image force between a spherical dust particle which is uniformly electrically charged and the dust-proofing layer, hereinafter referred to as $F_4$, is represented by the following formula. Furthermore, when the electrically charged dust particle approaches the dust-proofing layer which is not originally electrically charged, a charge opposite in sign but of the same magnitude as that of the dust particle is induced on the dust-proofing layer. This induction causes $F_3$.

$$F_4 = -\frac{1}{4\pi\varepsilon_0} \cdot \frac{(\varepsilon - \varepsilon_0)}{(\varepsilon + \varepsilon_0)} \cdot \frac{q^2}{(2r)^2} \quad (10)$$

In Formula 10, $\varepsilon_0$ is the permittivity of free space, equal to $8.85\times10^{-12}$ (F/m); $\varepsilon$ is the permittivity of the dust-proofing layer; q is the electrical charge of the dust particle; and r is the radius of the dust particle. $F_4$ substantially depends on degree of the electrical charge on the dust particle. Consequently, $F_3$ can be lowered by removing electrical charge in the dust particle adhering to the dust-proofing layer using the anti-static layer.

It is preferable that the surface resistivity of the anti-static layer be less than or equal to $1\times10^{14}$ $\Omega$/square. It is even more preferable that the surface resistivity be less than or equal to $1\times10^{12}$ $\Omega$/square. The refractive index of the anti-static layer is not especially limited, but if the refractive index of the anti-static layer is approximately an intermediate value between that of the substrate and that of the dust-proofing layer, the highest anti-reflective effect can be obtained. The thickness of the anti-static layer is not limited and can be determined according to the application, but is preferably between 0.01 and 3 µm.

The material of the anti-static layer is not limited to a specified material, and any colorless and highly transparent material can be utilized. The anti-static layer is formed of at least one conductive inorganic compound which is selected from the group consisting of antimony oxide, indium oxide, tin oxide, zinc oxide, ITO (tin doped indium oxide), and ATO (antimony doped tin oxide).

The anti-static layer may be a composite layer which comprises fine particle (conductive inorganic fine particle) of the conductive inorganic compound mentioned above, and binder, or may be a dense layer (for example, a deposited layer) comprising the conductive inorganic compound mentioned above. The binder component is a monomer or an oligomer whose polymer is the binder. Examples of the binder component include metal alkoxide, oligomer of the metal alkoxide, and ultraviolet curing or thermosetting compound such as acrylic ester.

(6) Anti-Reflective Layer

The anti-reflective layer may be disposed on a light-output surface of the light-transmitting substrate. The material constituting the anti-reflective layer is not limited to a specific material, but $SiO_2$, $TiO_2$, $MgF_2$, SiN, $CeO_2$, $ZrO_2$, etc. can be used. The anti-reflective layer may be composed of a single layer but is preferably composed of a multilayer. The multilayer is preferably constructed so that a light reflected at an interface between two layers and a light incident in each layer interfere with each other and then balance each other out. In particular, it is possible to greater improve the anti-reflective efficiency by plying two or more layers whose reflective indexes are different. For example, the anti-reflective layer, which has five to ten layers, is obtained by alternatively coating $SiO_2$ and $TiO_2$ by vacuum deposition.

(7) Silica Layer

The first optical low-pass filter may have a silica layer as an undercoat layer of the water-oil repellent layer. The adhesion of the water-oil repellent layer to the dust-proofing layer increases by forming the water-oil repellent layer over the dust-proofing layer overlaid by the silica layer. The silica layer can be produced by vacuum deposition. The thickness of the silica layer is preferably 5 to 100 nm.

(8) Stack Structure

The first low-pass filter is not limited to the structures described below, but preferably has one of the following stack structures:

(a) water-oil repellent layer/dust-proofing layer/anti-static layer/infrared-cut coat layer/light-transmitting substrate (birefringent plate/adhesive layer/infrared-cut plate)/anti-reflective layer;

(b) water-oil repellent layer/dust-proofing layer/anti-static layer/infrared-cut coat layer/light-transmitting substrate (infrared-cut plate/adhesive layer/birefringent plate)/anti-reflective layer;

(c) water-oil repellent layer/dust-proofing layer/infrared-cut coat layer/anti-static layer/light-transmitting substrate (birefringent plate/adhesive layer/infrared-cut plate)/anti-reflective layer;

(d) water-oil repellent layer/dust-proofing layer/infrared-cut coat layer/anti-static layer/light-transmitting substrate (infrared-cut plate/adhesive layer/birefringent plate)/anti-reflective layer;

(e) water-oil repellent layer/dust-proofing layer/anti-static layer/light-transmitting substrate (birefringent plate/adhesive layer/infrared-cut plate)/infrared-cut coat layer;

(f) water-oil repellent layer/dust-proofing layer/anti-static layer/light-transmitting substrate (infrared-cut plate/adhesive layer/birefringent plate)/infrared-cut coat layer;

(g) water-oil repellent layer/dust-proofing layer/light-transmitting substrate (infrared-cut plate/adhesive layer/birefringent plate)/infrared-cut coat layer;

(h) water-oil repellent layer/dust-proofing layer/light-transmitting substrate (birefringent plate/adhesive layer/infrared-cut plate)/infrared-cut coat layer;

(i) water-oil repellent layer/dust-proofing layer/infrared-cut coat layer/light-transmitting substrate (birefringent plate/adhesive layer/infrared-cut plate)/anti-reflective layer;

(j) water-oil repellent layer/dust-proofing layer/infrared-cut coat layer/light-transmitting substrate (infrared-cut plate/adhesive layer/birefringent plate)/anti-reflective layer;

(k) water-oil repellent layer/anti-static layer/dust-proofing layer/infrared-cut coat layer/light-transmitting substrate (infrared-cut plate/adhesive layer/birefringent plate)/anti-reflective layer;

(l) water-oil repellent layer/dust-proofing layer/infrared-cut coat layer/light-transmitting substrate (birefringent plate/adhesive layer/infrared-cut plate/adhesive layer/birefringent plate/adhesive layer/birefringent plate)/anti-reflective layer;

(m) water-oil repellent layer/dust-proofing layer/infrared-cut coat layer/light-transmitting substrate (birefringent plate/adhesive layer/birefringent plate/adhesive layer/infrared-cut plate/adhesive layer/birefringent plate)/anti-reflective layer;

(n) water-oil repellent layer/silica layer/dust-proofing layer/ultraviolet and infrared-cut coat layer/light-transmitting substrate (birefringent plate/adhesive layer/infrared-cut plate)/anti-reflective layer;

(o) water-oil repellent layer/silica layer/dust-proofing layer/ultraviolet and infrared-cut coat layer/light-transmitting substrate (birefringent plate/adhesive layer/birefringent plate/adhesive layer/infrared-cut plate/adhesive layer/birefringent plate)/anti-reflective layer; and so on.

[2] Method for Producing First Low-Pass Filter (1) Method for Producing Dust-Proofing Layer (a) Producing Finely Rough Alumina Layer At first, a gel layer including alumina is formed by applying an application liquid including aluminum compound, or a deposited layer comprising aluminum, alumina, or a mixture of these is formed. Next, the finely rough alumina layer is obtained by treating the gel or deposited layer with hot water.

(i) Producing Gel Layer Including Alumina

Examples of the aluminum compound include aluminum alkoxide, aluminum nitrate, and aluminum sulfate, but aluminum alkoxide is preferable. A method for producing the finely rough alumina layer using aluminum alkoxide is disclosed in Japanese Patent No. 3688042 and Japanese Unexamined Patent Publication Nos. H9-202649 and H9-202651. According to the method in No. 3688042, No. H9-202649, and No. H9-202651, at first, an application liquid including aluminum alkoxide, water, and stabiliser is applied to the substrate, and then the alumina gel layer is formed from the applied liquid on the substrate by the sol-gel method. Next, the finely rough alumina layer is obtained by treating the alumina gel layer with hot water.

Next, the method for producing the finely rough alumina layer using the aluminum alkoxide will be explained in detail. Examples of the aluminum alkoxide include aluminum trimethoxide, aluminum triethoxide, aluminum triisopropoxide, aluminum tri-(n-butoxide), aluminum tri-(sec-butoxide), aluminum tri-(tert-butoxide), aluminum acetyl acetate, and oligomer obtained by partially hydrolyzing one or more than one of these.

If the finely rough alumina layer includes the above optional component, the optional component material, which is at least one selected from the group consisting zirconium alkoxide, silane alkoxide, titanium alkoxide, and zinc compound, is added to the application liquid.

Examples of the zirconium alkoxide, include zirconium tetra-methoxide, zirconium tetra-ethoxide, zirconium tetra-(n-propoxide), zirconium tetraisopropoxide, zirconium tetra-(n-butoxide), zirconium tetra-(t-butoxide), etc.

The silane alkoxide is represented by the following formula:

$$Si(OR^6)_x(R^7)_{4-x} \quad (11)$$

In Formula 11, $R^6$ is preferably an alkyl group having 1 to 5 carbon atoms, or an acyl group having 1 to 4 carbon atoms such as a methyl group, ethyl group, n-propyl group, i-propyl group, n-butyl group, sac-butyl group, tert-butyl group, acetyl group, etc. $R^7$ is preferably an organic group having 1 to 10 carbon atoms, for example: a non-substituted hydrocarbon group such as a methyl group, ethyl group, n-propyl group, i-propyl group, n-butyl group, tert-butyl group, n-hexyl group, cyclohexyl group, n-octyl group, tert-octyl group, n-decyl group, phenyl group, vinyl group, allyl group, etc.; and a substituted hydrocarbon group such as a γ-chloropropyl group, $CF_3CH_2-$ group, $CF_3CH_2CH_2-$ group, $C_2F_5CH_2CH_2-$ group, $C_3F_7CH_2CH_2CH_2-$ group, $CF_3OCH_2CH_2CH_2-$ group, $C_2F_5OCH_2CH_2CH_2-$ group, $C_3F_7OCH_2CH_2CH_2-$ group, $(CF_3)_2CHOCH_2CH_2CH_2-$ group, $C_4F_9CH_2OCH_2CH_2CH_2-$ group, 3-(perfluoro cyclohexyloxy) propyl group, $H(CF_2)_4CH_2OCH_2CH_2CH_2-$ group, $H(CF_2)_4CH_2CH_2CH_2-$ group, γ-glycidoxypropyl group, γ-mercaptopropyl group, 3,4-epoxycyclohexylethyl group, γ-methacryloyloxypropyl group etc. x is is an integer ranging from 2 to 4.

Examples of the titanium alkoxide include tetramethoxy titanium, tetraethoxy titanium, tetra-(n-propoxy) titanium, tetra-isopropoxy titanium, tetra-(n-propoxy) titanium, tetra-(n-butoxy) titanium, tetra-isobutoxy titanium, etc.

Examples of the zinc compound include zinc acetate, zinc chloride, zinc nitrate, zinc stearate, zinc oleate, and zinc salicylate, etc., and zinc acetate and zinc chloride being preferred.

The quantity of the optional component material is preferably 0.01 to 50 mass percents, and is more preferably 0.05 to 30 mass percents with respect to 100 mass percents of total quantity of the aluminum alkoxide and the optional component material.

The stabilizer is preferably added to the application liquid. As the stabilizer, there are β-dikotones such as acetylacetone, ethyl acetoacetate, etc.; alkanol amines such as monoethanol amine, diethanol amine, triethanol amine, etc.; and metal alkoxides, etc.

The application liquid may include a solvent, such as methyl alcohol, ethyl alcohol, propyl alcohol, butyl alcohol, methyl cellosolve, ethyl cellosolve, etc.

The molar ratio of the metal alkoxide, the solvent, the stabilizer, and the water ((aluminum alkoxide+optional component material):solvent:stabilizer:water) is preferably 1:10-100:0.5-2:0.1-5.

A catalyst may be added to the application liquid in order to accelerate the hydrolysis of the alkoxy group or in order to accelerate dehydration condensation. Examples of the catalyst include nitric acid, hydrochloric acid, sulfuric acid, phosphoric acid, acetic acid, and ammonia. The molar ratio of the added catalyst with respect to the metal alkoxide is preferably 0.0001 to 1.

Organic water-soluble polymer may be added to the application liquid, if desired. When the alumina gel layer which is formed from the application liquid including the organic water-soluble polymer is treated with hot water, the organic water-soluble polymer is dissolved from the alumina gel layer so that the reaction surface area between the alumina gel layer and the hot water is increased. Therefore, it is possible to produce the finely rough alumina layer in a short period and at relatively low temperature. The shape of the roughness of the finely rough alumina layer is controlled by selecting the kind and molecular weight of the added organic water-soluble polymer.

Examples of the organic water-soluble polymer include polyvinyl pyrrolidone, polyvinyl alcohol, polymethyl vinylether, polyethylene glycol, and, polypropylene glycol are exemplified. The quantity of organic water-soluble polymer may be 0.01 to 10 mass percents, with respect to 100 mass percents of alumina, assuming that all aluminum alkoxide is changed to the alumina.

As the method of applying the application liquid, any common coating method, such as a dip coating method, a spin coating method, a spray method, a flow coating method, a roll coating method, a reverse coating method, a flexo printing method, a screen printing method, or a combination of two or more of these can be utilized. Among these, the dip coating method is preferable because it makes it easy to produce a uniform layer and to control the thickness of the layer. For example, the thickness of the layer can be controlled by changing the speed of withdrawal in the dip coating method, the rotational speed of the substrate in the spin coating method, or the concentration of the application liquid. In the dip coating method, it is preferable that the speed of withdrawal be about 0.1 to 3.0 mm/second.

The conditions for drying the applied layer of application liquid are not limited, but depend on the heat resistance of the substrate. Generally, the substrate with an applied layer is dried at between room temperature and 400 degrees Celsius for 5 minutes to 24 hours.

(ii) Method for Producing Deposited Layer

The deposited layer comprising aluminum, alumina, or a mixture of these is formed on the light-transmitting substrate using physical vapor deposition, such as vacuum deposition, sputtering, or ion-plating, etc., or a chemical vapor deposition (CVD), such as thermal CVD, plasma CVD, or optical CVD, etc. Vacuum deposition is preferable from an economical standpoint. It is preferable that the thickness of the deposited layer be from 5 to 500 nm in order to form the uniform deposited layer and to form the dust-proofing layer with a three-dimensional average surface roughness in a preferable range.

In the vacuum deposition method, the deposited layer is formed by condensing vapor of the deposition material, in this case aluminum, alumina, or a mixture thereof, on the light-transmitting substrate under a high vacuum, such as about $1 \times 10^{-4}$ to $1 \times 10^{-2}$ Pa.

The method for vaporizing the deposition material is not limited to any specific method. Any method for vaporizing, such as vaporization by an electric heating source, vaporization by an electron beam radiated from an E-type electron gun, vaporization by a large current electron beam generated by hollow cathode discharge, or laser ablation, (that is, vaporization by laser pulse), can be utilized. It is preferable that the substrate be rotated during the deposition process, held so that the surface to be treated faces the deposition material. The thickness of the deposited layer can be controlled by adjusting the deposition time.

An aluminum deposited layer is formed by using aluminum as the deposition material. The deposition speed and temperature of the substrate during deposition are not limited, but are preferably from 1 to 10 nm/second and 20 to 80 degrees Celsius, respectively, in order to obtain a uniform deposited layer.

An alumina deposited layer is formed according to a first or second method. In the first method, alumina is used as the deposition material. In the second method, aluminum is used as the deposition material and a reactive deposition is carried out while a little oxygen is blown into the vacuum deposition apparatus. In the first method, in order to form a uniform alumina deposited layer, the deposition speed and temperature of the substrate during deposition process are not limited but are preferably from 0.1 to 1.0 nm/minute, and 20 to 300 degrees Celsius, respectively. In the second method, the oxygen is blown so that the pressure in the vacuum deposition apparatus is maintained between $1 \times 10^{-4}$ and $1 \times 10^{-2}$ Pa.

Among the various CVDs, the plasma CVD, where a thin layer can be formed at low temperature, is preferable. In the plasma CVD, an aluminum deposited layer is formed by generating plasma of a source gas and then carrying out a chemical reaction, such as decomposition, reduction, oxidation, substitution, and so on, at the surface of the substrate. Examples of the source gas include an aluminum halide such as $AlCl_3$, organic aluminum such as $Al(CH_3)_3$, $Al(i-C_4H_9)_3$, $(CH_3)_2AlH$, etc., organic aluminum complex, aluminum alcoholate, and so on. The source gas is sent to the surface of tho substrate with a substitute gas, such as helium, argon, and so on. Reactive gas, such as hydrogen, nitrogen, ammonia, nitrous oxide, oxide, carbon monoxide, methane, and so on, may be mixed with the source gas.

(iii) Hot Water Treatment

The gel layer or the deposited layer is treated with hot water (or a mixture of water and an organic solvent), having temperature between 40 and 100 degrees Celsius. For example, the substrate having the gel layer or deposited layer is preferably immersed in the hot water or the mixture. In this case, the temperature of the hot water or the mixture is preferably 50 to 100 degrees Celsius. Furthermore, the immersion period is preferably 1 to 240 minutes.

A base may be added to the water which is used in the hot water treatment if desired. The dust-proofing layer will be formed quickly owing to the added base. An inorganic or organic base can be used as the base. Amine can serve as the organic base. Examples of the preferable amine includes an alcoholamine such as monoethanolamine, diethanolamine, triethanolamine, etc., and alkylamine such as methylamine, dimethylamine, trimethylamine, n-buthylamine, n-propylamine etc. Examples of the inorganic base include ammonia, sodium hydroxide, and potassium hydroxide. The quantity of the base is not limited, but is preferably 0.1 to 1 mass percent with respect to the 100 mass percent of the total of water and base.

In case the mixture of water and organic solvent is used, alcohol, such as methanol, ethanol, propylalcohol, buthylalcohol, and so on, is preferable. The quantity of organic solvent is not limited as long as the benefits of this embodiment are not lost.

By treating the gel or deposited layer with hot water, roughness comprising a plurality of convexities having an irregular fine shape and an interspersed plurality of concavities having a grooved shape, are formed on the superficial layer of the gel or deposited layer. The reason such roughness is formed is unclear. However, it is hypothesized that at least the superficial layer of the deposited layer is changed to aluminum hydroxide, such as boehmite, by the hot water, and then the aluminum hydroxide is dissolved out and precipitates instantly.

(iv) Drying Process

The substrate is preferably dried at from room temperature to 500 degrees Celsius after producing the roughness on the surface of the gel or deposited layer. The substrate is more preferably burned at 100 to 450 degrees Celsius. The drying or burning period is preferably 10 minutes to 36 hours. Drying results in a dust-proofing layer with roughness, whose main component is alumina, aluminum hydroxide or a mixture thereof. Furthermore, even if the aluminum deposited layer is treated with hot water, the dust-proofing layer whose main component is alumina, aluminum hydroxide or a mixture thereof is usually obtained.

(b) Producing Finely Rough Zinc Compound Layer

At first, the gel layer is formed by applying an application liquid (solution or dispersion liquid) including zinc compound on the substrate and drying it. Next, the finely rough zinc compound layer is obtained by treating the gel layer with water having a temperature greater than or equal to 20 degrees Celsius.

Examples of zinc compounds include zinc acetate, zinc chloride, zinc nitrate, zinc stearate, zinc oleate, and zinc salicylate, etc., and zinc acetate or zinc chloride is preferred. If the finely rough zinc compound layer includes the optional component, at least one optional component material which is selected from the group consisting of aluminum alkoxide, zirconium alkoxide, silane alkoxide, and titanium alkoxide may be added to the application liquid.

The example of aluminum alkoxide, zirconium alkoxide, the silane alkoxide, and titanium alkoxide is the same as those mentioned above. The quantity of the optional component material is preferably between 0.05 and 50 mass percents, and more preferably, 0.05 to 30 mass percents, with respect to the 100 mass percent of the total quantity of zinc compound and the optional component material.

The solvent of the application liquid and the method for applying the application liquid when the finely rough zinc compound layer is produced may be the same as those used to produce the finely rough alumina layer. The molar ratio in the application liquid is preferably (zinc compound+optional component material):solvent=1:10-20. The stabilizer and catalyst described above, and water may be added to the application liquid, if desired. The application liquid which has been applied to the substrate is dried at room temperature for about 30 minutes, but may be dried by heat if desired.

The dried gel layer is treated with water at a temperature greater than or equal to 20 degrees Celsius. Due to this treatment, the superficial layer of the gel is deflocculated and then the structure thereof is rearranged so that zinc oxide and/or zinc hydroxide, or their hydrate are precipitated and then the precipitation grows on the superficial layer. In this treatment, the temperature of the water is preferably 20 to 100 degrees Celsius. The treatment period is preferably 5 minutes to 24 hours. The finely rough zinc compound layer which is produced as described above is usually colorless and of high transparency.

(c) Producing by Photolithographic Method

The metal oxide layer comprising a transparent metal oxide such as alumina, zinc oxide, zirconia, silica, titania, etc., is patterned by the photolithographic method. The metal oxide layer may be obtained by a wet coat process such as the sol-gel method or by the deposition method, as described above.

In this method, at first, a photoresist is applied on the metal oxide layer, and a mask is applied thereon, and then the photoresist is exposed. Next, the exposed part or the non-exposed part of the photoresist is removed by a developing process so that the resist pattern is formed and then the metal oxide layer is etched. The mask has a fine pattern so that the SRa of the layer after etching is in the range as described above. The shape of the pattern is not limited.

Anisotropic etching is preferable as the etching method. Examples of anisotropic etching include fast atom beam (FAB) etching, reacting ion etching (RIE), reactive ion beam etching (RIBE), etc. Among these, FAB and RIE are preferable because of their high anisotropy, with FAB the more preferable. The fast atom beam is a neutral energy particle beam, and the directional quality thereof is high because electric charge does not accumulate and ions are prevented from repelling each other. Therefore, when dry etching is carried out by the FAB, the fine roughness can be formed accurately.

(2) Producing Water-Oil Repellent Layer (a) Method for Producing Layer of Inorganic Compound Including Fluorine A layer comprising an inorganic compound including fluorine can be formed by physical vapor deposition, such as vacuum deposition, or by chemical vapor deposition, similar to the method for forming the deposited layer for dust-proofing as explained above except for the use of an inorganic compound including fluorine as the deposition material or the source gas.

(b) Method for Producing Layer of Copolymer of Unsaturated Ester Monomer Including Fluoroaliphatic Group and Unsaturated Silane Monomer A layer of the copolymer of the unsaturated ester monomer including a fluoroaliphatic group and an unsaturated silane monomer may be formed using a method of coating copolymer or a method of polymerization. In the method of coating copolymer, at least both monomers are copolymerized, a solution including the synthesized copolymer is applied to the substrate, and the applied solution is dried. In the method of polymerization, a solution including both monomers or oligomers of these is applied on the substrate, the applied solution is dried, and after that they are polymerized.

(i) Case of Method of Coating Copolymer

The copolymer of the unsaturated ester monomer including the fluoroaliphatic group and unsaturated silane monomer is produced by a known method of radical polymerization. For example, the copolymer can be obtained by dissolving at least both monomers in an adequate solvent and adding a radical polymerization initiator such as azobisisobutyronitrile to the solvent, and then heating the solvent with the monomers and the initiator at 60 to 75 degrees Celsius for 10 to 20 hours. Examples of the solvent include hydrofluoroether, such as $C_3F_7OCH_3$, $C_3F_7OC_2H_5$, $C_4F_9OCH_3$, and $C_4F_9OC_2H_5$, and hydrofluorocarbon, such as $CF_3CFHCFHCF_2CF_3$ and $C_5F_{11}H$.

A copolymer-solution is prepared by dissolving or dispersing the copolymer which is obtained as described above in the solvent. A highly volatile solvent may be used as the solvent. Examples of the highly volatile solvent include hydrofluoroether and hydrofluorocarbon as described above; perfluoroether such as $C_4F_9OCF_3$, $C_4F_9OC_2F_5$, etc.; linear fluorocarbon such as ethane trifluoride, $C_6F_{14}$, and $C_7F_{16}$, etc.; saturated hydrocarbon such as pentane, hexane, heptane, etc.; ethers such as tetrahydrofuran, diethyl ether, dioxane, etc.; ketones such as acetone, methyl ethyl ketone, methyl i-butyl ketone, cyclohexane, etc.; and esthers such as ethyl acetate, butyl acetate, etc. Hydrofluoroether and perfluoroether are especially preferable.

The concentration of the copolymer-solution is preferably 0.1 to 150 g/L, and is more preferably 1 to 50 g/L. The copolymer-solution which is commercially available may be utilised, for example, Novec EGC-1700 and Novec EGC-1720 manufactured, by Sumitomo 3M Ltd.

Any common coating method, as mentioned above, may be utilized for applying the copolymer-solution. The solvent is removed by drying after applying the copolymer-solution. Common drying methods such as air drying, heated air drying, and oven drying, may be utilized for drying the copolymer-solution. A vacuum drying method can be utilized if desired. In the air drying method, for example, low humidity gas may be forcibly blown over the copolymer-solution.

(ii) Case of Method of Polymerization

It is preferable to carry out a radiation polymerization after applying monomer/oligomer solution to the substrate. In the radiation polymerization, uv light, x rays, or an electron beam are preferably utilized as the radial rays. The method of polymerization using UV light is explained below. The monomer/oligomer solution is prepared by dissolving or dispersing both the monomers or oligomers of these and a radical polymerization initiator in the solvent. The radical polymerization initiator and solvent may be the same as those mentioned above. The concentration of the monomer/oligomer solution is preferably 0.1 to 150 g/L, and more preferably 1 to 50 g/L.

The monomer/oligomer solution may include a stabilizer such as acetonitrile, ureas, sulfoxide, amides, etc., a polymerisation inhibitor such as hydroquinone monomethyl ether, and so on, in addition to the components described above.

Any common coating method, mentioned above, may be utilized for applying the monomer/oligomer solution on the substrate. The solvent is removed by drying after applying the copolymer-solution. The monomer/oligomer solution may be dried in a manner similar to that described above. The monomers or oligomers on the substrate are polymerized by UV light. The intensity of the irradiated UV light may be adjusted according to a kind of monomer, thickness of the layer, and other factors, but may be about 500 to 2,000 mJ/cm$^2$. A UV light source can be selected from a group consisting of low-pressure mercury-vapor lamps, high-pressure mercury-vapor lamps, xenon lamps, super high-pressure mercury-vapor lamps, fusion ultraviolet lamps, and so on.

(iii) Crosslinking

The layer of the copolymer may be crosslinked, if desired. Examples of crosslinking methods include irradiating ionizing radiation, use of a crosslinking agent, and vulcanization. α-rays, β-rays (electron ray), γ-rays, and so on can be utilized as the ionizing radiation. An example of the crosslinking agent is a compound having two or more unsaturated bonds, such as butadiene, isoprene, etc. The crosslinking agent is added to the solution including both monomers before polymerization if the method of coating copolymer is performed. The crosslinking agent is added to the monomer/oligomer solution if the method of polymerization is carried out.

(c) Producing Layer of Organic Silicone Polymer Including Fluorocarbon Group

A layer of a polymer obtained by hydrolyzing a silane compound including fluorocarbon can be formed by the same method as that using the sol-gel method as described above, except for the use of the compound represented by the Formula 8.

(d) Producing Layer of Fluorocarbon Polymer

A layer of fluorocarbon polymer can be formed using the vacuum deposition method or a wet method such as a coating method. A method for producing a layer of a fluorocarbon polymer using a coating method is explained below. One of two methods may be applied, as described below.

In the first coating method, a solution including the copolymer or polymer obtained by polymerizing or copolymerizing at least an olefin compound including fluorine, is applied on the substrate, and then the applied solution is dried. In the second coating method, at first, a solution including either an olefin compound including fluorine or oligomer of the olefin compound is applied to the substrate. Next, the applied solution is dried, and after that it is polymerized or copolymerized.

Both the first and second coating methods may be produced by the same method as that for producing the layer of the copolymer of unsaturated ester monomer including fluoroaliphatic group and unsaturated silane monomer, as described above, except for the use of the olefin compound, the oligomer thereof, or both. Therefore, an explanation of the methods is omitted. However, if the olefin compounds including fluorine are thermosetting, it is preferable to heat the solution at 100 to 140 degrees Celsius for about 30 to 60 minutes.

(3) Anti-Static Layer

When the layer consists of the conductive inorganic compound, the anti-static layer is produced by the same method of physical vapor deposition such as the vacuum deposition, or the chemical vapor deposition used to produce the deposited layer of the dust-proofing layer, except for the use of the conductive inorganic compound as the deposition material or the source gas. The composite layer of the conductive inorganic fine particle and binder component is produced by a coating method (wet coating method) such as the dip coating method. Next, the method for producing the composite layer of the conductive inorganic fine particle and the binder according to the coating method is explained below.

(a) Preparing Slurry

An average particle diameter of the conductive inorganic fine particle is preferably about 5 to 80 nm. If the average particle diameter is more than 80 nm, the transparency of the anti-static layer will be too low. On the other hand, it is difficult to produce conductive inorganic fine particles with an average diameter less than 5 nm.

The mass ratio of the conductive inorganic fine particle to the binder component is preferably 0.05 to 0.7. If the mass ratio is more than 0.7, it is difficult to uniformly coat the composite layer, and the formed composite layer will be too fragile. If the mass ratio is less than 0.05, the conductivity of the anti-static layer will be lowered.

Metal alkoxide, an oligomer of the metal alkoxide, an ultraviolet curable compound, or a thermosetting compound is preferred examples of the binder component. When the metal alkoxide, the oligomer, or an ultraviolet curable compound is utilized, the anti-static layer including the binder can be formed even when the substrate is not highly heat resistant.

Preferable metal alkoxides include silane alkoxide, zirconium alkoxide, titanium alkoxide, and aluminum alkoxide as described above, with silane alkoxide the most preferable of the group.

Examples of the ultraviolet curable compound, or the thermosetting compound include a radical polymerizable compound, a cation polymerizable compound, and an anion polymerizable compound. These compounds can be used together.

Acrylic acid or acrylic ester can be utilized as the radical polymerizable compound. Examples of the acrylic acid or the acrylic ester include (meth)acrylic acid; monofunctional (meth)acrylate such as 2-hydroxyethyl (meth)acrylate, 2-hydroxypropyl (meth)acrylate, etc.; di(meth)acrylate such as pentaerythritol di(meth)acrylate, ethylene glycol di(meth)acrylate, etc.; tri(meth)acrylate such as trimethylol propane tri(meth)acrylate, pentaerythritol tri(meth)acrylate, etc.; multifunctional (meth)acrylate such as pentaerythritol tetra(meth)acrylate, di-pentaerythritol penta(meth)acrylate, etc.; and an oligomer of these.

An epoxy compound is preferable as the cation polymerizable compound. Examples of the epoxy compound include phenyl glycidyl ether, ethylene glycol diglycidyl ether, glycerin diglycidyl ether, vinyl cyclohexene dioxide, 1,2,8,9-diepoxy limonene, 3,4 epoxy cyolohoxylymethyl 3',4'-epoxy cyclohexane carboxylate, and bis(3,4-epoxy cyclohexyl) adipate.

If the metal alkoxide is utilized as the binder component, water and a catalyst is added to the slurry including the inorganic fine particles. The catalyst is the same as the one used when the finely rough alumina layer is produced. Also, the quantities of water and catalyst are the same as those used when the finely rough alumina layer is produced.

If the radical polymerizable compound or cation polymerizable compound is used as the binder component, a radical polymerization initiator or a cation polymerization initiator is added to the slurry including inorganic fine particles. A compound which generates a radical by receiving UV light is utilized as the radical polymerization initiator. Examples of a preferable radical polymerization initiator include benzyls, benzophenones, thioxanthoncs, benzyl dimethyl ketals, α-hydroxyalkyl phenones, hydroxyketones, amino alkylphenones, and acyl phosphine oxides. The quantity of the radical polymerization Initiator is about 0.1 to 20 parts by mass with respect to 100 parts by mass of the radical polymerizable compound.

A compound which generates a cation by receiving UV light is utilized as the cation polymerization initiator. Examples of the cation polymerization initiator include an onium salt, such as a diazonium salt, a sulfonium salt, and an iodonium salt. The quantity of the cation polymerization initiator is about 0.1 to 20 parts by mass with respect to 100 parts by mass of the cation polymerizable compound.

The inorganic fine particles and the binder component mixed into the slurry may include more than two kinds of each. In addition, a general additive, such as a dispersant, stabilizer, viscosity modifier, or colorant, can be mixed into the slurry as long as the desired properties of the slurry remain.

The concentration of the slurry influences the thickness of the anti-static layer. Examples of the solvent include alcohols such as methanol and ethanol, alkoxy alcohols such as 2-ethoxy ethanol and 2-buthoxy ethanol, ketols such as diacetone alcohol, ketones such as acetone and methyl ethyl ketone, aromatic hydrocarbons such as toluene and xylene, and esters such as ethyl acetate and butyl acetate. The quantity of solvent is about 20-10,000 parts by mass with respect to 100 parts by mass of the total of the inorganic fine particles and the binder component.

(b) Coating

The slurry including the inorganic fine particles is applied to the filter by the same method used to produce the finely rough alumina layer.

After applying the slurry, the binder component in the slurry is polymerized. If the binder component is the metal alkoxide or its oligomer, the binder component is cured at 80 to 400 degrees Celsius for 30 minutes to 10 hours. If the binder component is the ultraviolet curable compound, it is polymerized by irradiating with UV light of about 50 to 3,000 mj/cm$^2$, which results in the layer comprising the conductive inorganic fine particles and the binder. The period of ultraviolet light exposure may depend on the thickness of the layer, but ranges between 0.1 and 60 seconds.

After that, the solvent of the slurry including conductive inorganic fine particles is volatilized. In order to volatilize the solvent, the slurry may be kept at room temperature or heated to about 30-100 degrees Celsius.

(4) Producing Infrared-Cut Coat Layer, Anti-Reflective Layer, and Silica Layer

The infrared-cut coat layer (including the ultraviolet and infrared-cut coat layer), the anti-reflective layer, and the silica layer can be produced by the vacuum deposition method, or a wet coat process such as the sol-gel method, etc.

(b) Other Treatment

Before producing the dust-proofing layer, the infrared-cut coat layer, the water-oil repellent layer, the anti-static layer, and the silica layer, a corona discharge treatment or a plasma treatment may be carried out on the substrate or the layer underlying the above-mentioned layer to be formed in order to remove adsorbed water and impurities and to activate the surface. Such treatments increase the adhesiveness between the layers.

[3] Second Optical Low-Pass Filter

The second optical low-pass filter comprises: at least (1) the birefringent plate and the infrared-cut plate which are disposed substantially parallel to each other in this order from the light-input side; (2) the dust-proofing layer which is provided on the light-input surface of the birefringent plate, with the fine roughness formed at the surface of the dust-proofing layer, and (3) the infrared-cut coat layer which is provided between the dust-proofing layer and the birefringent plate or on the light-output surface of the infrared-cut plate.

Preferably, the second optical low-pass filter has the water-oil repellent layer which is provided on the outermost surface of the filter. The second optical low-pass filter may have the anti-static layer which is provided between the water-oil repellent layer and the dust-proofing layer or between the dust-proofing layer and the birefringent plate. The second optical low-pass filter may have an anti-reflective layer which is provided on the light-output surface of the infrared-cut plate. The second optical low-pass filter may have a silica layer as an undercoat layer of the water-oil repellent layer.

The second optical low-pass filter may have the same structure except that the birefringent plate and the infrared-cut plate are disposed substantially parallel to each other with an intervening space. Therefore, the detailed explanation of each layer is omitted. However, the second optical low-pass filter may have two or more birefringent plates. Specifically, the other birefringent plate may be laid on the light-input surface of the birefringent plate, or the birefringent plate may be laid on the light-output surface of the infrared-cut plate. Possible arrangements of the birefringent plate and the infrared-cut plate are: one to four birefringent plates/space/infrared-cut plate; and one to four birefringent plates/space/infrared-cut plate/one to four birefringent plates; etc.

The second low-pass filter is not limited to the structures described below, but preferably has one of the stack structures described below:
(a) water-oil repellent layer/dust-proofing layer/anti-static layer/infrared-cut coat layer/birefringent plate/space/infrared-cut plate/anti-reflective layer;
(b) water-oil repellent layer/dust-proofing layer/infrared-cut coat layer/anti-static layer/birefringent plate/space/infrared-cut plate/anti-reflective layer;
(c) water-oil repellent layer/dust-proofing layer/anti-static layer/birefringent plate/space/infrared-cut plate/infrared-cut coat layer;
(d) water-oil repellent layer/dust-proofing layer/birefringent plate/space/infrared-cut plate/infrared-cut coat layer;
(e) water-oil repellent layer/dust-proofing layer/infrared-cut coat layer/birefringent plate/space/infrared-cut plate/anti-reflective layer;
(f) water-oil repellent layer/dust-proofing layer/infrared-cut coat layer/birefringent plate/space/infrared-cut plate/birefringent plate/birefringent plate/anti-reflective layer;
(g) water-oil repellent layer/dust-proofing layer/infrared-cut coat layer/birefringent plate/birefringent plate/space/infrared-cut plate/birefringent plate/anti-reflective layer;
(h) water-oil repellent layer/silica layer/dust-proofing layer/ultraviolet and infrared-cut coat layer/birefringent plate/space/infrared-cut plate/anti-reflective layer;
(i) water-oil repellent layer/silica layer/dust-proofing layer/ultraviolet and infrared-cut coat layer/birefringent plate/birefringent plate/space/infrared-cut plate/birefringent plate/anti-reflective layer; and so on.

[4] Third Optical Low-Pass Filter

The third optical low-pass filter comprises: at least (1) the infrared-cut plate and the birefringent plate which are disposed substantially parallel to each other in that order from the light-input side; (2) the dust-proofing layer which is provided on the light-input surface of the infrared-cut plate, with the fine roughness formed at the surface of the dust-proofing layer; and (3) the infrared-cut coat layer which is provided between the dust-proofing layer and the infrared-cut plate or on the light-output surface of the birefringent plate.

Preferably, the third optical low-pass filter has the water-oil repellent layer provided on the outermost surface of the filter. The third optical low-pass filter may have the anti-static layer between the water-oil repellent layer and the dust-proofing layer or between the dust-proofing layer and the infrared-cut plate. The third optical low-pass filter may have an anti-reflective layer on the light-output surface of the birefringent plate. The third optical low-pass filter may have a silica layer as an undercoat layer of the water-oil repellent layer.

The third optical low-pass filter may have the same structure except that the infrared-cut plate and the birefringent plate are disposed substantially parallel to each other with an intervening space. Therefore, a detailed explanation of each layer is omitted. However, the third low-pass filter may have two or more birefringent plates. Specifically, the birefringent plate may be laid on the light-input surface of the infrared-cut plate, or the other birefringent plate may be laid on the light-output surface of the first birefringent plate. Example arrangements of the birefringent plate and the infrared-cut plate are: infrared-cut plate/space/one to four birefringent plates; and, one to four birefringent plates/infrared-cut plate/space/one to four birefringent plates; etc.

The third low-pass filter is not limited to the structures described below, but preferably has one of the stack structures described below:
(a) water-oil repellent layer/dust-proofing layer/anti-static layer/infrared-cut coat layer/infrared-cut plate/space/birefringent plate/anti-reflective layer;
(b) water-oil repellent layer/dust-proofing layer/infrared-cut coat layer/anti-static layer/infrared-cut plate/space/birefringent plate/anti-reflective layer;
(c) water-oil repellent layer/dust-proofing layer/infrared-cut coat layer/infrared-cut plate/space/birefringent plate/anti-reflective layer;
(d) water oil repellent layer/dust-proofing layer/anti-static layer/infrared-cut plate/space/birefringent plate/infrared-cut coat layer;
(e) water-oil repellent layer/dust-proofing layer/infrared-cut plate/space/birefringent plate/infrared-cut coat layer;
(f) water-oil repellent layer/silica layer/dust-proofing layer/infrared-cut plate/space/birefringent plate/infrared-cut coat layer;
(g) water-oil repellent layer/silica layer/dust-proofing layer/infrared-cut plate/space/birefringent plate/ultraviolet infrared-cut coat layer; and so on.

[5] Imaging Apparatus

The first to third filters described above are preferably utilized as the low pass filter for an imaging device of an imaging apparatus. The imaging apparatus in which the first to third filter is utilized is not limited, but may include a digital still camera such as a digital single-lens reflex camera, etc., a digital video camera, and an image input apparatus such as a facsimile, a scan, etc.

Each of the first to third optical low-pass filters is disposed over a light-receiving surface of an imaging device. The imaging device may be a CCD, a CMOS, or a Live MOS, etc.

Figure 1B:
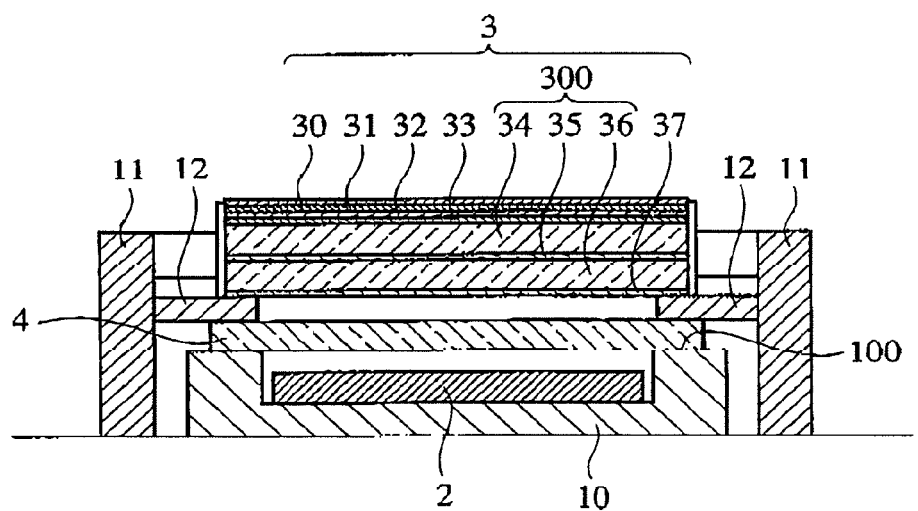
FIG. 1B is an enlarged cross-sectional view of the essential part of FIG. 1.

FIGS. 1A and 1B show one embodiment of the digital still camera having the first optical low-pass filter. This camera has the imaging device 2 which is disposed in the center of a casing 10 provided in a camera body 1, the first optical low-pass filter 3 which is disposed above the receiving surface, and a plurality of lenses 5a, 5b, . . . , 5n which are disposed on an optical path 6 where the light incident on imaging device 2 passes. The imaging device 2 is disposed at a lower position than edge 100 of the casing 10, and a protective cover 4 is attached to edge 100. Therefore, a space exists between the imaging device 2 and the protective cover 4.

The optical low-pass filter 3 comprises the water-oil repellent layer 30, the dust-proofing layer 31, the anti-static layer 32, the infrared-cut coat layer 33, the light-transmitting substrate 300 (having the birefringent plate 34, the adhesive layer 35, and the infrared-cut plate 36), and the anti-reflective layer 37 which are disposed in that order from the light-input side and which are formed into one body, and is held by a holding pole 11. A space is formed between the optical low-pass filter 3 and the protective cover 4 by a plate spacer 12 which is connected to a holding pole 11

Figure 2:
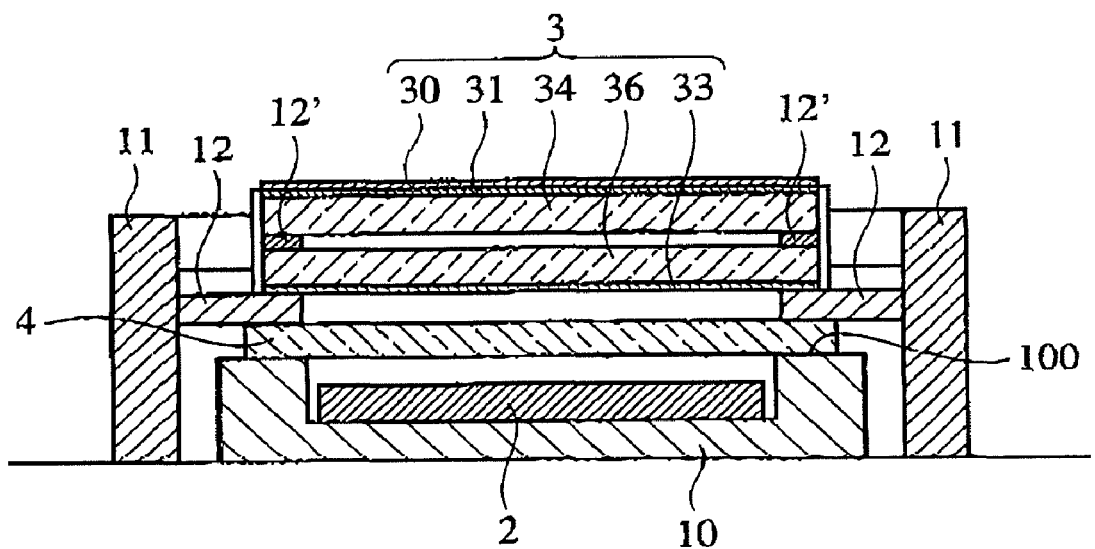
FIG. 2 is a cross-sectional view of an essential part of another embodiment of a digital still camera having an optical low-pass filter.

FIG. 2 shows another embodiment of the digital still camera having the second optical low-pass a filter. This camera has same structure as that in FIG. 1, except that the optical low-pass filter (the second low-pass filter) 3 has the water-oil repellent layer 30, the dust-proofing layer 31, the birefringent plate 34, the infrared-cut plate 36, and the infrared-cut coat layer 33 which are disposed in that order from the light-input side, and that a space is formed between the birefringent plate 34 and the infrared-cut plate 36 by a plate spacer 12' which is connected to the holding pole 11.

Figure 3:
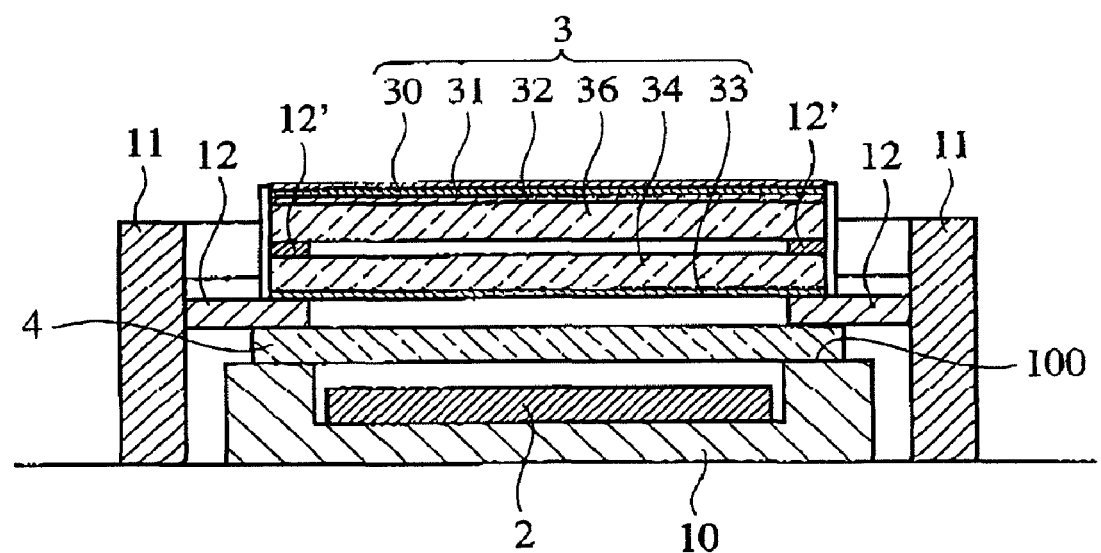
FIG. 3 is a cross-sectional view of an essential part of yet another embodiment of a digital still camera having an optical low-pass filter.

FIG. 3 shows yet another embodiment of the digital still camera having the third optical low-pass filter. This camera has the same structure as that in FIG. 1, except that the optical low-pass filter (the third optical low-pass filter) 3 has the water-oil repellent layer 30, the dust-proofing layer 31, the anti-static layer 32, the infrared-cut plate 36, the birefringent plate 34, and the infrared-cut coat layer 33 which are disposed in that order from the light-input side, and a space is created between the birefringent plate 34 and the infrared-cut plate 36 by a plate spacer 12' which is connected to the holding pole 11.

The first to third optical low-pass filters may have a dust-proofing mechanism which mechanically removes dust adhering to the outermost surface of the filter. A vibrator may be utilized as the dust-proofing mechanism. A piezoelectric element or a stage apparatus may be utilized as the vibrator.

Figure 4A:
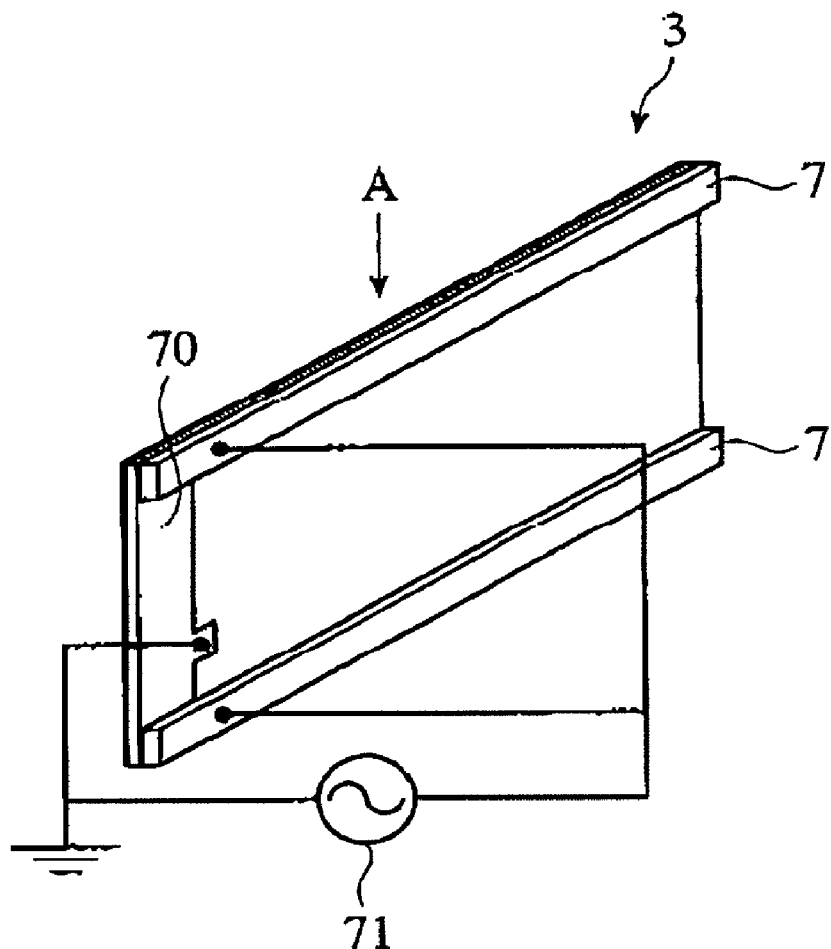
FIG. 4A is a perspective view of one embodiment of the filter having piezoelectric elements.
Figure 4B:
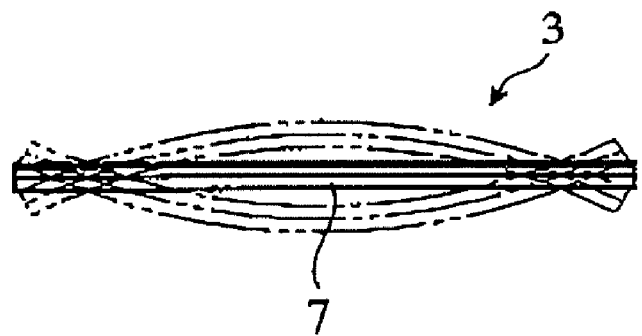
FIG. 4B is a plan view when viewing from perspective A of FIG. 4A.
Figure 4C:
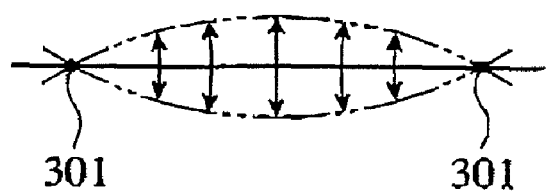
FIG. 4C is a schematic view of vibration nodes in the filter of FIG. 4A.
Figure 4D:
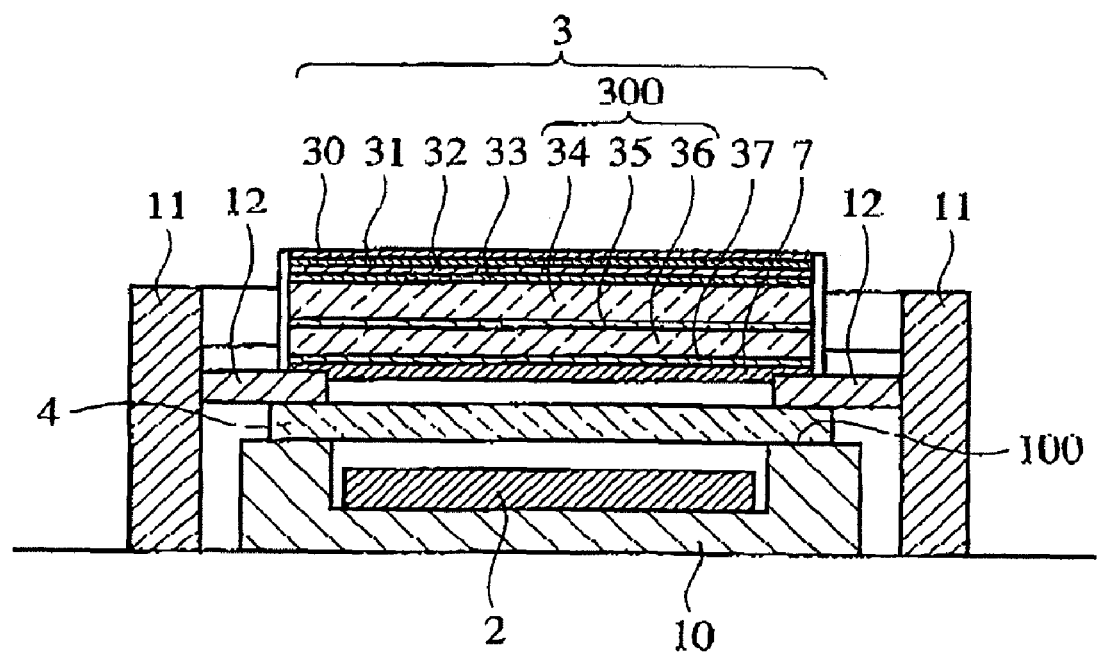
FIG. 4D is a cross-sectional view of an essential part of the filter of FIG. 4A.

FIGS. 4A and 4D show one embodiment of a digital still camera having the first low-pass filter with a piezoelectric element. The camera in this embodiment has the same structure as the one in FIGS. 1A and 1B, except that the rectangular optical low-pass filter 3 has piezoelectric elements 7 extending in the longitudinal direction of the filter 3, and which are mounted on both ends in the width direction of the filter 3, and an electric terminal 70 which is provided at one end in the longitudinal direction. The electric terminal 70 can be mounted by adhesion of a conductive material by gluing, vacuum deposition, plating, or other methods. The electric terminal 70 functions as one electrode of the piezoelectric elements 7 and as an electrode for grounding.

When both the piezoelectric elements 7 are expanded and contracted in phase by applying periodic voltage to the piezoelectric elements 7 by an oscillator 71, the optical low-pass filter 3 vibrates and bends, as shown in FIG. 4B.

As shown in FIG. 4C, the optical low-pass filter 31 is vibrated with bending, so that nodes 301 and 301 of the vibration are generated near both longitudinal ends. Due to this vibration, the dust which adheres to the filter 3 can be flicked off in the optical axis direction, which is perpendicular to the filter surface. The voltage and frequency applied may be appropriately determined.

The circuit for driving the piezoelectric elements 7 is not limited, but may be the circuit disclosed in Japanese Unexamined Patent Publication No. 2002-204379 U.S. (Pub. No. 2004-012714) or No. 2003 319222 (U.S. Pub. Nos. 2003-202114 and 2007-296819). Furthermore, because the filter 3 is electrically connected to the camera body 1 through a ground wire as shown in FIG. 4A, the electrification of the optical low-pass filter 3 can always be prevented, which can increase the dust-proofing capacity of the filter 3.

Figure 5A:
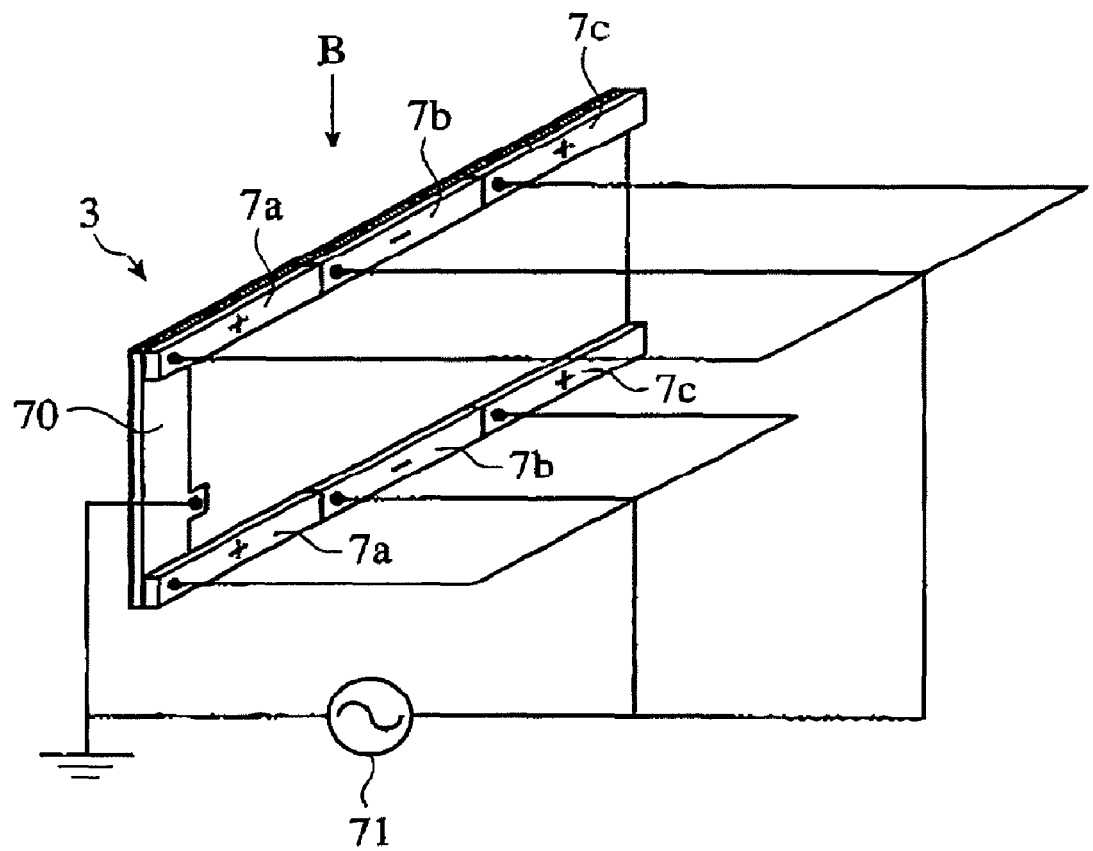
FIG. 5A is a perspective view of another embodiment of the filter having piezoelectric elements.

FIG. 5A shows another embodiment of a digital still camera having the first low-pass filter with the piezoelectric element. The camera in this embodiment has the same structure as that of the camera shown in FIGS. 1A and 1B, except that the rectangular optical low-pass filter 3 has three piezoelectric elements 7a, 7b, and 7c extending in the longitudinal direction of the filter 3 which are mounted in series on both ends in the width direction of the filter 3. The direction of polarization of the piezoelectric elements 7a, 7b, and 7c is alternately inverted along the horizontal direction (namely, the longitudinal direction of the filter 3). Furthermore, the direction of polarization is shown as "+" and "−" in FIG. 5A.

Figure 5B:
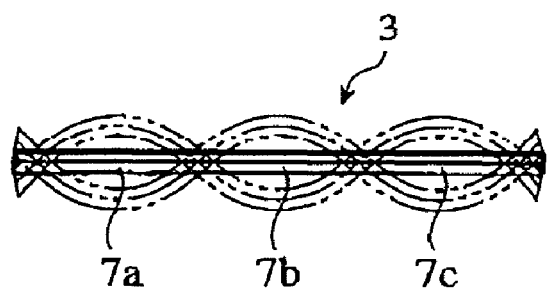
FIG. 5B is a plan view of the filter viewed from perspective B of FIG. 5A.
Figure 5C:
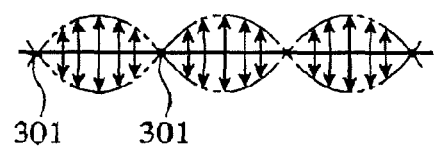
FIG. 5C is a schematic view of nodes of vibration in the filter of FIG. 5A.

As shown in FIG. 5B, the optical low-pass filter 3 is vibrated with bending, by applying periodic voltage of the same phase to each of the piezoelectric elements 7a, 7b, and 7c by an oscillator 71. In this case, nodes 301 of the vibration are generated near both longitudinal ends of the filter 3 and in between, with the position of nodes 301 being changeable by adjusting the frequency of the voltage. Therefore, the dust which adheres to the filter 3 can be flicked off in the optical axis direction by changing the position of nodes 301. The value of the applied voltage may be appropriately determined.

Figure 6:
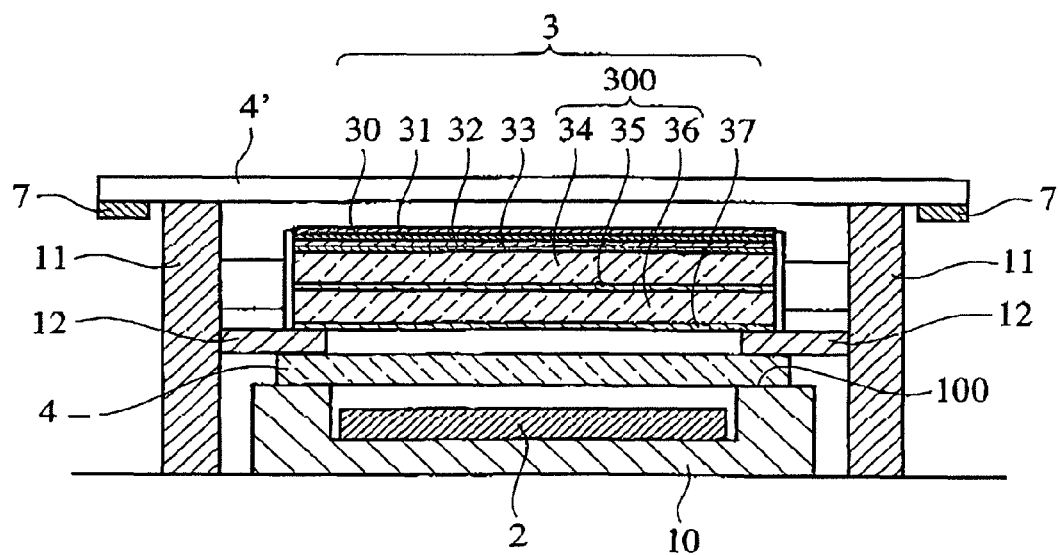
FIG. 6 is a cross-sectional view of an essential part of yet another embodiment of a digital still camera having an optical low-pass filter.

The digital still camera shown in FIG. 6 has the same structure as that of the digital still camera in FIG. 1, except that a protective cover 4' is provided above the optical low-pass filter 3 on the light-input side of the filter 3 and the piezoelectric elements 7 are provided on both ends of the protective cover 4'. The dust removal movement by the piezoelectric elements 7 is as described above.

Figure 7B:
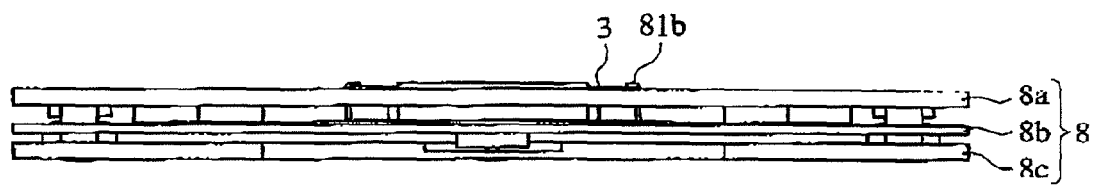
FIG. 7B is a plan view of the stage apparatus in FIG. 7A.
Figure 7C:
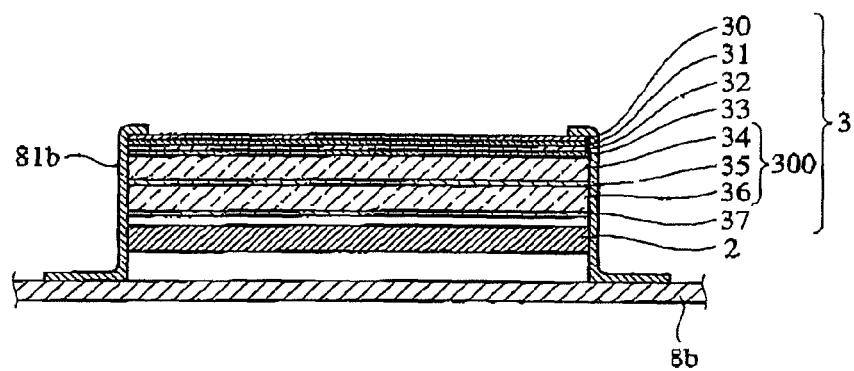
FIG. 7C is an enlarged cross-sectional view of the filter in FIG. 7A.

FIG. 7 gives an example of a digital still camera which has the first optical low-pass filter and in which a stage apparatus is provided. This camera has the same structure as the one in FIG. 1, except that it has the stage apparatus 8 including a first holding plate 8a, a stage plate 8b, and a second holding plate 8c which are disposed in that order from the light-input side and that the first optical low-pass filter 3 and the imaging device 2 are mounted on the stage plate 8b by the hold portion 81b. The stage apparatus 8 is fixed to the camera body 1.

As shown in FIGS. 8A and 8B, the first holding plate 8a has a rectangular plate portion, and tongue portions 80a having a rectangular shape are connected to upper parts of both side ends of the rectangular plate portion, respectively. The first holding plate 8a has: (i) a rectangular opening 81a in which the imaging device 2 and the optical low-pass filter 3 fixed on the stage plate 8b are arranged; (ii) rectangular magnets 82a extending in a vertical (up and down) direction along both sides of the opening 81a which are symmetrically arranged on a back surface thereof; (iii) rectangular magnets 83a extending in a horizontal direction and which are symmetrically arranged at lower part of a back surface thereof; (iv) position sensors 84a which are disposed at lower parts of the tongue portions 80a on the back surface thereof, respectively; and (v) holes 85a which are disposed at the center of the lower end and at the upper parts of the tongue portions 80a, respectively.

The south and north poles of each magnet 82a are aligned in the horizontal direction. The south and north poles of each magnet 83a are aligned in the vertical direction. Each hole 85a is composed of a relatively larger diameter portion 85a' and a relatively smaller diameter portion 85a" which are disposed in that order from the light-input side. The first holding plate 8a is preferably composed of a soft magnetic material.

As shown in FIGS. 9A and 9B, the stage plate 8b has a rectangular; plate portion, and tongue portions 80b having a rectangular shape are connected to upper parts of both side ends of the rectangular plate portion, respectively. The stage plate 8b has: (i) a holding member 81b which is provided at the center of the plate 8b in order to hold the imaging device 2 and the optical low-pass filter 3; (ii) horizontal drive coils 82b which are arranged along both sides of the holding member 81*b* so as to face the magnets 82*a* of the first holding plate 8*a*, respectively; (iii) vertical drive coils 83*b* which are arranged at the lower part of the plate 8*b* so as to face the magnets 83*a* of the first holding plate 8*a*, respectively; (iv) position sensors 84*b* which are arranged at lower parts of the tongue portions 80*b* so as to face the position sensors 84*a* of the first holding plate 8*a*, respectively; (v) square holes 85*b* which are disposed at the center of lower end of the rectangular plate portion and at upper parts of the tongue portions 80*b*, respectively; and (vi) rotation members 86*b* which are provided at the center of the lower part of the rectangular plate portion (namely, between the holding member 81*b* and hole 85*b* at the center of the lower part, and at the centers of tongue portions 80*b* (namely, between the position sensor 84*b* and the hole 85*b*), respectively. The stage plate 8*b* is preferably composed of a soft magnetic material.

The coils 82*b* and 83*b* are a planar coil which is parallel to the stage plate 8*b*. The horizontal drive coils 82*b* are spiraled, and left and right sides 82*b*' and 82*b*" thereof extend in the vertical direction. The vertical drive coils 83*b* are also spiraled, and the upper and lower sides 83*b*' and 83*b*" extend in the horizontal direction. In FIG. 9, as a matter of convenience, the coils 82*b* and 83*b* are depicted as having several windings, but in fact, the conductive wire is wound several dozen times.

The rotation member 86*b* is mounted on a back surface of the stage plate 8*b* so as to rotate while contacting a concavity 86C (refer to FIG. 11) of the second holding plate 8*c*. The friction between the stage plate 8*b* and the second holding plate 8*c* becomes small due to the rotation member 86*b*, and thereby, the stage plate 8*b* is smoothly vibrated. The number of the rotation members 86*b* can be three or more, but is not limited to a specific number.

Figure 10:
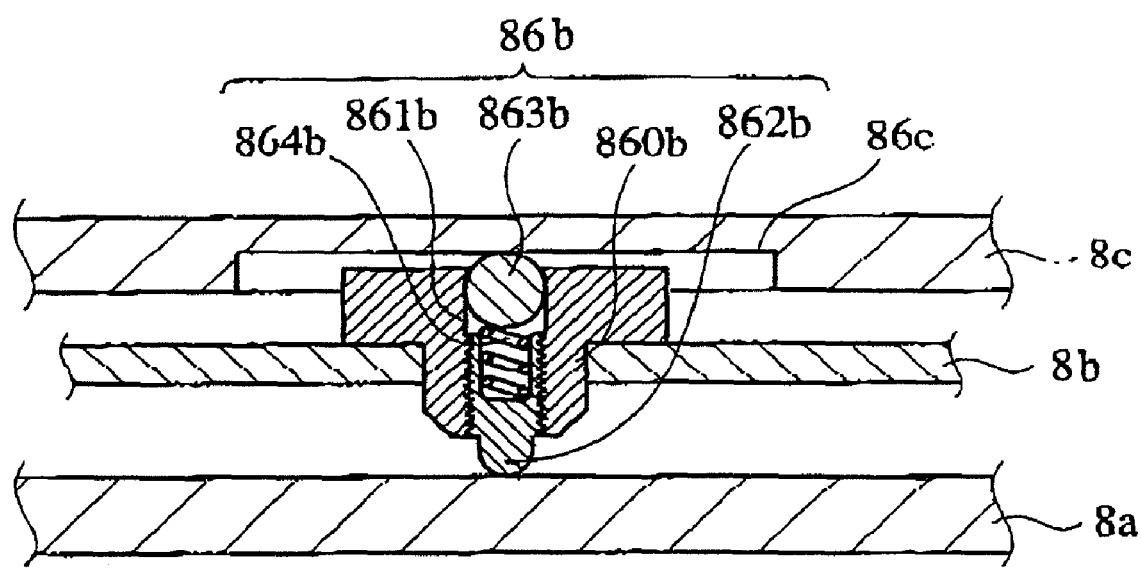
FIG. 10 is an enlarged cross-sectional view of the stage plate of FIGS. 9A and 9B.

As shown in FIG. 10, the rotation member 86*b* includes a hold portion 860*b* having a cylindrical hole 861*b*, an adjusting member 862*b* which is screwed into the cylindrical hole 861*b*, and a ball 863*b*. The inner surface of the top end of the cylindrical hole 861*b* is curved inward, and the ball 863*b* is loosely fitted in the top end. A compression coil spring 864*b* is inserted into a hole of the adjusting member 862*b*. One end of the spring 864*b* contacts a bottom base of the hole of the adjusting member 862*b* and the other end of the spring 864*b* contacts the ball 863*b*. The ball 863*b* is biased by the spring 864*b*.

As shown in FIG. 11, the second holding plate 8*c* has a C-shaped plate portion and tongue portions 80*c* having a rectangular shape which are connected to upper parte of both outer side ends of the C-shaped plate portion. The second holding plate 8*c* has: (i) concavities 86*c* which are provided at the positions facing the rotation members 86*b* of the stage plate 8*b*, respectively; and (ii) columned projections 85*c*, which are arranged so as to face the holes 85*a* of the first holding plate 8*a*, respectively. The projection 85*c* includes a top end 850*c* which is inserted into the smaller diameter portion 85*a*" of the hole 85*a* and a screw hole 851*c* into which a screw 85 is screwed. The second holding plate 8*c* is preferably composed of a soft magnetic material.

As shown in FIGS. 12A and 12B, the stage plate 8*b* is disposed between the first and second holding plates 8*a* and 8*b*. The top end 850*c* of the projection 85*c* is inserted into the smaller diameter portion 85*a*" of the hole 85*a* and the screw 85 is screwed into the female screw hole 851*c* of the projection 85*c* so that the first and second holding plates 8*a* and 8*b* are fixed to each other.

The projection 85*c* functions as a spacer which creates a space between the first and second holding plates 8*a* and 8*b*. The stage plate 8*b* is held by the first and second holding plates 8*a* and 8*b* between these, while the projections 85*c* are inserted through the holes 85*b*. Because the length of each side of the square hole 85*b* is greater than the diameter of the projections 85*c*, the stage plate 8*b* is movable relative to the first and second holding plates 8*a* and 8*b* but the movement of the stage plate 8*b* is restricted by contact between the projections 85*c* and the inner surface of the hole 85*b*. Namely, the projections 85*c* function as stoppers which restrict the movement of the stage plate 8*b*.

Horizontal magnetic circuits are formed between the magnets 82*a* of the first holding plate 8*a* and the parts of the second holding plate 8*c* which face the magnets 82*a*, respectively. Vertical magnetic circuits are formed between the magnets 83*a* and 83*a* of the first holding plate 8*a* and the parts of the second holding plate 8*c* which face the magnets 83*a*, respectively. Namely, the first and second holding plates 8*a* and 8*c* function as a yoke. The stage plate 8*b* is moved in the horizontal direction by the horizontal drive coils 82*b* and the horizontal magnetic circuits, and the stage plate 8*b* is moved in the vertical direction by the vertical drive coils 83*b* and the vertical magnetic circuits.

Because of the projection 85*c* acting as a stopper, the right side 82*b*' of the horizontal drive coil 82*b* always faces the north pole of the magnet 82*a*, and the left side 82*b*" of the horizontal drive coil 83*b* always faces the south pole of the magnet 82*a*. Similarly, the upper side 83*b*' of the vertical drive coil 83*b* always faces the north pole of the magnet 83*a* and the lower side 83*b*" always faces the south pole of the magnet 83*a*.

Figure 13:
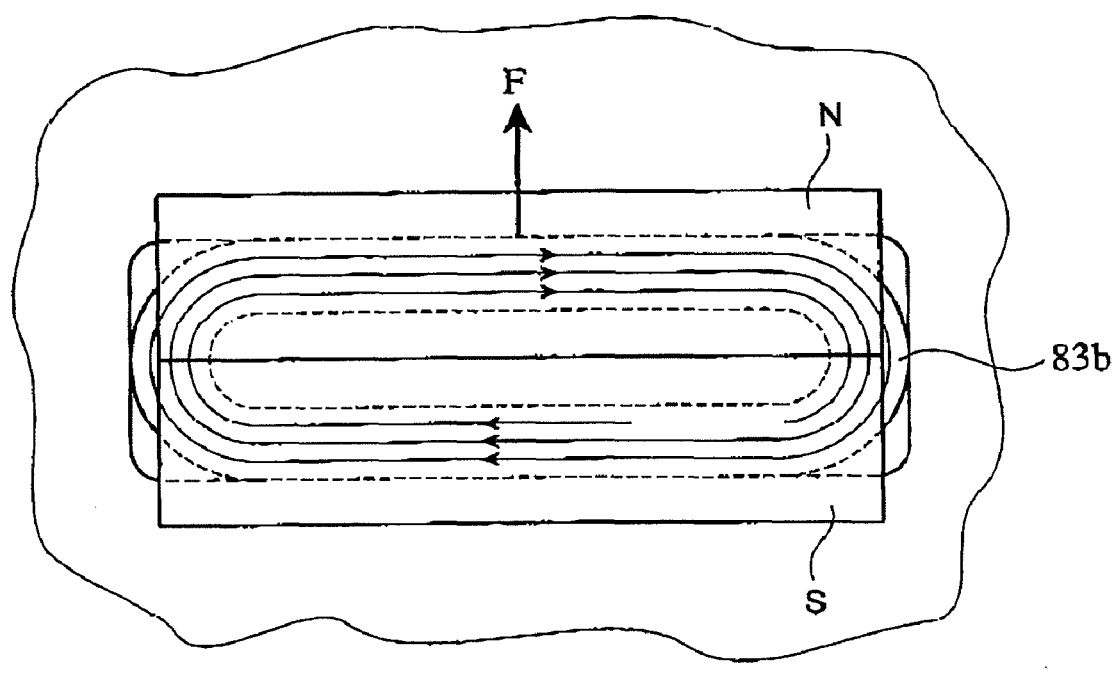
FIG. 13 is an enlarged front view of an electromagnetic force generating in the stage apparatus.

As shown in FIG. 13, an electromagnetic force F is generated upwards bypassing a current into the vertical drive coils 83*b* and 83*b* in the direction indicated by the arrow. Therefore, the stage plate 8*b* which is arranged at the initial position is moved upwards relative to the first and second holding plates 8*a* and 8*c* as shown in FIG. 15. In contrast, an electromagnetic force is generated downwards by passing a current into the vertical drive coils 83*b* and 83*b* in a direction opposite to that indicated by the arrow in FIG. 13. Therefore, the stage plate 8*b* is moved downwards relative to the first and second holding plates 8*a* and 8*c* as shown in FIG. 16. Accordingly, the stage plate 8*b* is vibrated in the vertical direction by applying an AC (alternating current) voltage to the vertical drive coils 83*b*. Due to the vibration, the stage plate 8*b* strikes the projection 85*c* causing the dust adhering to the optical low-pass filter 3 to be cast off by the impact of the hit.

Similarly, the stage plate 8*b* is vibrated in the horizontal direction and strikes the projection 85*c* by application of an AC voltage to the horizontal drive coils 82*b*. Accordingly, the dust adhering to the optical low-pass filter 3 will be cast off by the impact of the hit.

The impact strength, the vibration direction, and the period of the vibration may be adjusted by controlling the strength and the frequency of the AC voltage which is applied to the coils 82*a* and 82*c*. For example, the AC voltage may be controlled so that the vibration in the vertical direction and the vibration in the horizontal direction are generated in that order, or this combination of vibrations may be repeated. The stage plate 8*b* is preferably vibrated so as to mainly generate vibration in the vertical direction, because then the impact by gravitational force can be utilized.

Figure 14:
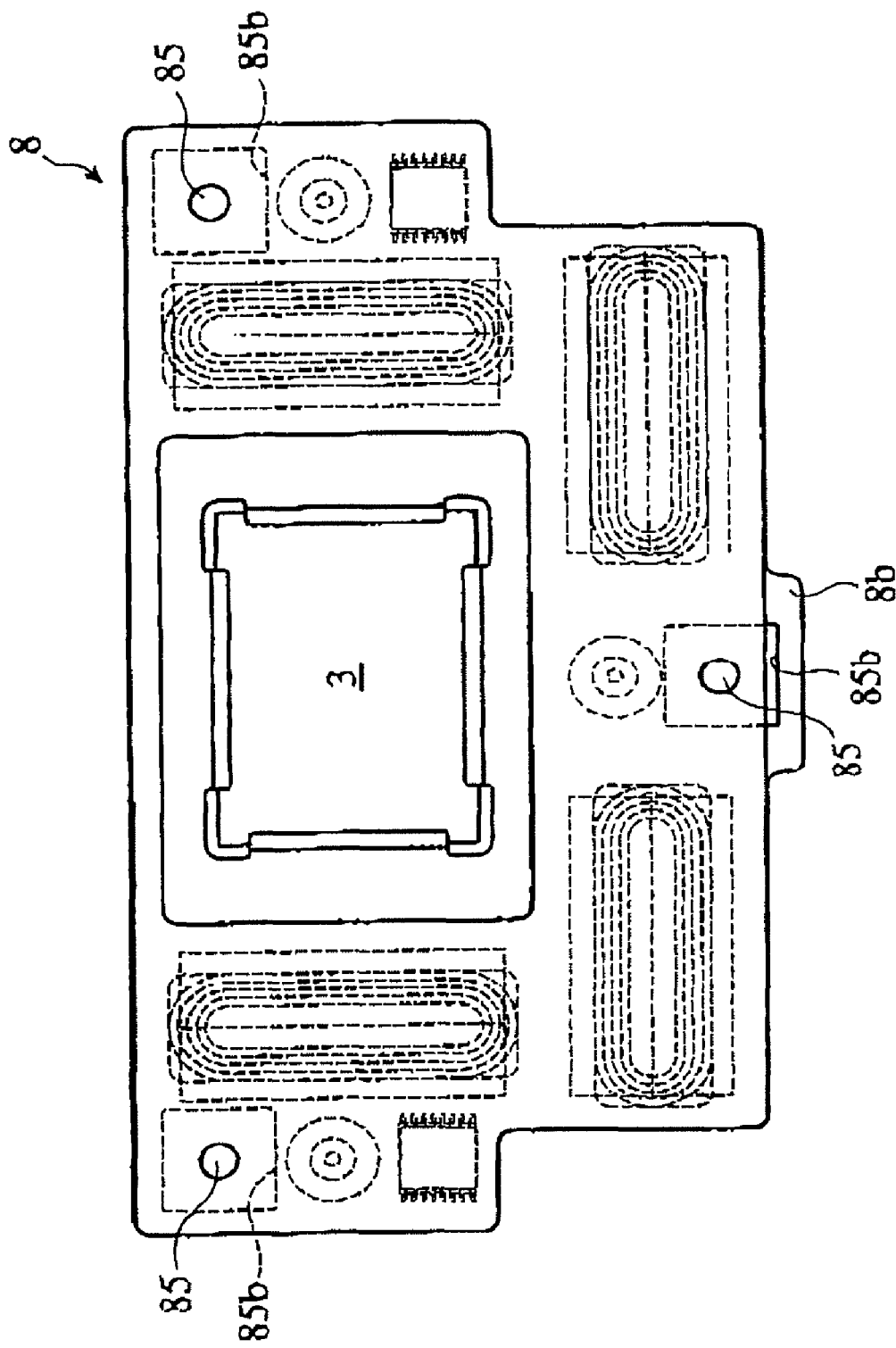
FIG. 14 is a front view of the stage apparatus of FIG. 7A in initial position.

The pair of position sensors 84*a* and 84*b* detect the quantity of displacement from the initial position of the stage plate 8 (refer to FIG. 14). Therefore, after removing the dust, the stage plate 8 is moved by passing the current in the coils 82*b* and 83*b* so that the stage 8*b* comes back to the initial position using the detected magnitude of displacement. An optical sensor including a light-emitting device and a light-receiving device and a hall element sensor detecting the position for using the magnetic field, etc. can be utilized as the position sensors 84*a* and 84*b*.

In order to drive the stage apparatus 8, the camera has a drive circuit as well as circuits which are generally used in a conventional camera, such as a power-supply circuit, a CPU for controlling the camera overall, an image-signal processing circuit, a display circuit, etc., but the drive circuit is not limited to a specific circuit. For example, a dust-removal switch is provided on the camera and if the switch is activated the stage apparatus 8 is driven by the drive circuit, or when the camera is turned on the stage apparatus 8 may be driven by the drive circuit.

As described above, the optical low-pass filter according to the above embodiments can reduce the intermolecular force and the contact-charging adhesion force of the dust by the dust-proofing layer with fine roughness. Therefore, the filter according to the above embodiments not only has high infrared-cut ability but also high dust-proofing ability, and it is not essential to provide the dust-proofing mechanism which mechanically removes dust. Hence, the cost, weight, and power consumption of the image apparatus can be reduced.

In particular, a filter which has the water-oil repellent layer on the outer surface thereof can reduce the liquid bridge force between the dust particle and the filter, thereby producing higher dust-proofing ability. Furthermore, a filter which has the anti-static layer can reduce the electrostatic attractive force and the electrostatic image force between the dust particle and the filter, and accordingly, will have higher dust-proofing ability.

Although the embodiments of the present invention have been described herein with reference to the accompanying drawings, obviously many modifications and changes can be made by those skilled in this art without departing from the scope of the invention.

The present disclosure relates to subject matter contained in Japanese Patent Application No. 2007-177665 (filed on Jul. 5, 2007) which is expressly incorporated herein, by reference, in its entirety.

The invention claimed is:

1. An optical low-pass filter which is disposed over a light-receiving surface of an imaging device, comprising:
   a light-transmitting substrate that comprises at least one birefringent plate and an infrared-cut plate, wherein the infrared-cut plate comprises an infrared absorbing glass or an infrared absorbing resin;
   a dust-proofing layer that is provided on a light-input surface of said light-transmitting substrate, fine roughness formed at a surface of said dust-proofing layer; and
   an infrared-cut coat layer that is provided between said dust-proofing layer and said light transmitting substrate or on a light-output surface of said light-transmitting substrate, wherein the infrared-cut coat layer comprises a dielectric multilayer.

2. A filter according to claim 1,
   wherein said filter comprises a water-repellant or water-and oil-repellent layer that is provided at an outermost surface of said filter.

3. A filter according to claim 2,
   wherein said filter comprises an anti-static layer that is provided between said water-repellent or water-and oil-repellent layer and said dust-proofing layer or between said dust-proofing layer and said light-transmitting substrate.

4. A filter according to claim 2,
   wherein said filter comprises a silica layer as an undercoat layer of said water-repellent or water-and oil-repellent layer.

5. A filter according to claim 1,
   wherein said filter comprises an anti-reflective layer that is provided on a light-output surface of said light-transmitting substrate.

6. A filter according to claim 1,
   wherein said dust-proofing layer includes at least one selected from a group consisting of alumina, aluminum hydroxide, zinc oxide, and zinc hydroxide.

7. A filter according to claim 1,
   wherein said fine roughness comprises a plurality of convexities having a fine shape and a plurality of cancavities having a grooved shape, said plurality of convexities irregularly distributed and said concavities located between said convexities.

8. A filter according to claim 1,
   wherein the three dimensional average surface roughness of an outermost surface of said filter is 1 to 100 nm.

9. A filter according to claim 1,
   wherein the maximum peak-to-valley value at the outermost surface of said filter is 5 to 1,000 nm.

10. A filter according to claim 1,
    wherein the specific surface area of an outermost surface of said filter is greater than or equal to 1.05.

11. A filter according to claim 1,
    wherein said filter comprises a dust-proofing mechanism that mechanically removes dust adhering to an outermost surface of said filter.

12. A filter according to claim 11,
    wherein said dust-proofing mechanism is a piezoelectric element that vibrates said filter.

13. A filter according to claim 12,
    wherein said dust-proofing mechanism comprises:
    a first holding plate that has a magnet;
    a second holding plate that is composed of a soft magnetic material; and
    a stage plate that is disposed between said first and second holding plates and is movably held by said first and second holding plates, said stage plated having a coil that faces said magnet, said filter being mounted on said stage plate,
    a magnetic circuit formed between said magnet of said first holding plate and a part of said second holding plate that faces said magnet, said stage plate being vibrated by applying alternating current to said coil.

14. An imaging apparatus comprising an imaging device and an optical low-pass filter that is disposed over a light-receiving surface of said imaging device, said filter comprising:
    a light-transmitting substrate that comprises at least one birefringent plate and an infrared-cut plate, wherein the infrared-cut plate comprises an infrared absorbing glass or an infrared absorbing resin;
    a dust-proofing layer that is provided on a light-input surface of said light-transmitting substrate, fine roughness formed at a surface of said dust-proofing layer; and an infrared-cut coat layer that is provided between said dust-proofing layer and said light-transmitting substrate or on a light-output surface of said light-transmitting substrate, wherein the infrared-cut coat layer comprises a dielectric multilayer.

15. An optical low-pass filter which is disposed over a light-receiving surface of an imaging device, comprising:
- a birefringent plate and an infrared-cut plate that are disposed substantially parallel to each other in that order from the light-input side, wherein the infrared-cut plate comprises an infrared absorbing glass or an infrared absorbing resin;
- a dust-proofing layer that is provided on a light-input surface of said birefringent plate, fine roughness formed at a surface of said dust-proofing layer; and
- an infrared-cut coat layer that is provided between said dust-proofing layer and said birefringent plate or on a light-output surface of said infrared-cut plate, wherein the infrared-cut coat layer comprises a dielectric multilayer.

16. A filter according to claim 15, wherein said filter comprises a water-repellent or water- and oil-repellent layer that is provided at an outermost surface of said filter.

17. A filter according to claim 16, wherein said filter comprises an anti-static layer that is provided between said water-repellent or water-and oil-repellent layer and said dust-proofing layer or between said dust-proofing layer and said birefringent plate.

18. A filter according to claim 16, wherein said filter comprises a silica layer as an undercoat layer of said water-repellent or water-and oil-repellent layer.

19. A filter according to claim 15, wherein said filter comprises an anti-reflective layer that is provided on a light-output surface of said infrared-cut plate.

* * * * *